(12) United States Patent
Li et al.

(10) Patent No.: US 11,784,919 B2
(45) Date of Patent: Oct. 10, 2023

(54) METHOD FOR SENDING BIERV6 PACKET AND FIRST NETWORK DEVICE

(71) Applicant: HUAWEI TECHNOLOGIES CO., LTD., Shenzhen (CN)

(72) Inventors: Lingshuai Li, Beijing (CN); Jingrong Xie, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/514,885

(22) Filed: Oct. 29, 2021

(65) Prior Publication Data

US 2022/0141127 A1     May 5, 2022

(30) Foreign Application Priority Data

Oct. 30, 2020   (CN) .......................... 202011191354.0

(51) Int. Cl.
    *H04L 45/28*         (2022.01)
    *H04L 45/00*         (2022.01)
    *H04L 45/74*         (2022.01)

(52) U.S. Cl.
    CPC .............. *H04L 45/28* (2013.01); *H04L 45/20* (2013.01); *H04L 45/74* (2013.01)

(58) Field of Classification Search
    None
    See application file for complete search history.

(56) References Cited

U.S. PATENT DOCUMENTS

| 10,547,538 | B2* | 1/2020 | Chen ....................... H04L 45/48 |
| 2007/0091793 | A1 | 4/2007 | Filsfils et al. |
| 2015/0138961 | A1 | 5/2015 | Wijnands et al. |
| 2016/0254991 | A1* | 9/2016 | Eckert ................. H04L 12/4633 370/225 |

(Continued)

FOREIGN PATENT DOCUMENTS

| CN | 101036126 A | 9/2007 |
| CN | 102571401 A | 7/2012 |

(Continued)

OTHER PUBLICATIONS

M. McBride et al, BIER IPv6 Requirements, draft-ietf-bier-ipv6-requirements-00, BIER Internet-Draft, May 29, 2019, total 12 pages.

(Continued)

*Primary Examiner* — Xavier S Wong
(74) *Attorney, Agent, or Firm* — Rimon PC

(57) ABSTRACT

A method for sending a BIERv6 (bit index explicit replication version 6) packet includes: determining, by a first network device, that an active next-hop device for reaching a second network device is faulty, where the first network device belongs to a first area in a BIER domain, the second network device and the active next-hop device belong to a second area in the BIER domain, the active next-hop device is a border device in the second area and is configured to connect to the first area, and the first area and the second area have different protocols; and sending, by the first network device, a BIERv6 packet to a backup next-hop device for reaching the second network device, where the backup next-hop device is a border device in the second area and is configured to connect to the first area.

12 Claims, 9 Drawing Sheets

(56) References Cited

U.S. PATENT DOCUMENTS

| | | | |
|---|---|---|---|
| 2018/0131532 A1* | 5/2018 | Wijnands | H04L 12/1845 |
| 2020/0106628 A1* | 4/2020 | Nainar | H04L 12/18 |

FOREIGN PATENT DOCUMENTS

| | | | |
|---|---|---|---|
| CN | 104811387 A | 7/2015 | |
| EP | 2658174 A1 | 10/2013 | |
| JP | 2009130393 A | 6/2009 | |
| JP | 2014504101 A | 2/2014 | |
| JP | 2014064252 A | 4/2014 | |
| JP | 2018530268 A | 10/2018 | |
| JP | 2020109916 A | 7/2020 | |
| WO | 2019201013 A1 | 10/2019 | |
| WO | 2020173340 A1 | 9/2020 | |

OTHER PUBLICATIONS

J. Xie et al, Encapsulation for BIER in Non-MPLS IPv6 Networks, draft-xie-bier-ipv6-encapsulation-08, Network Working Group Internet-Draft, Jul. 13, 2020, total 24 pages.

L. Geng et al, Inter-Domain Multicast Deployment using BIERv6 draft-geng-bier-ipv6-inter-domain-02, Network Working Group Internet-Draft, Oct. 27, 2020, total 11 pages.

* cited by examiner

METHOD FOR SENDING BIERV6 PACKET AND FIRST NETWORK DEVICE

CROSS-REFERENCE TO RELATED APPLICATIONS

This application claims priority to Chinese Patent Application No. 202011191354.0, filed on Oct. 30, 2020. The disclosure of the aforementioned application is hereby incorporated by reference in its entirety.

TECHNICAL FIELD

This application relates to the network communications field, and more specifically, to a method for sending an Internet Protocol version 6-based bit index explicit replication BIERv6 packet and a first network device.

BACKGROUND

An Internet Protocol (IP) multicast technology implements high efficient point-to-multipoint data transmission in an IP network, to effectively save on network bandwidth and reduce network load, and therefore is widely applied in a plurality of aspects such as real-time data transmission, multimedia conferencing, data copy, an Internet Protocol television (IPTV), a game, and simulation. In the multicast technology, a multicast tree is constructed on a control plane by using a multicast protocol, and then logic on a network plane is made to be tree-shaped by using the multicast tree, to implement multicast point-to-multipoint data forwarding. Each intermediate device using construction of a distribution tree as a core needs to maintain complex multicast forwarding information status. As a network scale is increasingly large and multicast data traffic increases over time, this multicast technology faces an increasingly large challenge in terms of costs and operation and maintenance.

Therefore, a new technology for constructing a multicast data forwarding path is proposed in the industry, which is referred to as a bit index explicit replication (bit index explicit replication, BIER) technology. The technology proposes a multicast technology architecture in which a multicast distribution tree does not need to be constructed. A BIER domain may be divided into different areas, and different protocols are deployed in the areas. If the BIER domain includes a first area and a second area, and an active next-hop device through which the first network device in the first area reaches the second area is faulty, traffic in the first area in the BIER domain cannot be sent to the second area in the BIER domain, causing traffic interruption. The active next-hop device in the second area is a border device that is in the second area and that is configured to connect to the first area.

Therefore, when the active next-hop device in the second area in the BIER domain is faulty, how to avoid interruption of traffic from the first area in the BIER domain to the second area in the BIER domain becomes a technical problem that needs to be urgently resolved.

SUMMARY

This application provides a method for sending an Internet Protocol version 6-based bit index explicit replication BIERv6 packet and a first network device. When an active next-hop device in a second area in a BIER domain is faulty, traffic in a first area in the BIER domain is forwarded to the second area in the BIER domain, thereby avoiding interruption of traffic from the first area in the BIER domain to the second area in the BIER domain.

According to a first aspect, a method for sending an Internet Protocol version 6-based bit index explicit replication BIERv6 packet is provided, including: determining, by a first network device, that an active next-hop device for reaching a second network device is faulty, where the first network device is an ingress device in a BIER domain, the second network device is an egress device in the BIER domain, the first network device belongs to a first area in the BIER domain, the second network device and the active next-hop device belong to a second area in the BIER domain, the active next-hop device is a border device in the second area and is configured to connect to the first area, and the first area and the second area have different protocols; and sending, by the first network device, a BIERv6 packet to a backup next-hop device for reaching the second network device, where the backup next-hop device is a border device in the second area and is configured to connect to the first area.

In the foregoing technical solution, when the active next-hop device through which the first network device in the first area in the BIER domain reaches the second area in the BIER domain is faulty, a border device connecting to the first area through the second area may be set as the backup next-hop device of the first network device. In this way, the first network device in the first area may forward the BIERv6 packet from the first area to the second area by using the backup next-hop device, so that when the active next-hop device in the second area in the BIER domain is faulty, traffic in the first area in the BIER domain is forwarded to the second area in the BIER domain, thereby avoiding interruption of traffic from the first area in the BIER domain to the second area in the BIER domain.

In a possible implementation, the method further includes: determining, by the first network device based on a network topology of the BIER domain, the active next-hop device and the backup next-hop device for reaching the second network device.

In another possible implementation, the first network device sends a bidirectional forwarding detection BFD control packet to the active next-hop device, where a destination address of the BFD control packet is a first address of the active next-hop device, and the first address is used to direct the active next-hop device to perform BIER forwarding on the BIERv6 packet. If the first network device does not receive, in a preset time interval, a BFD control packet sent by the active next-hop device, the first network device determines that the active next-hop device is faulty.

In the foregoing technical solution, when sending the BFD control packet to the active next-hop device, the first network device may use a special address that is of the active next-hop device and that is used to indicate to perform BIER forwarding on the BIERv6 packet. In this way, when the active next-hop device does not support BIER forwarding, the first network device can also quickly detect this case, thereby further improving accuracy of fault detection between devices.

In another possible implementation, that the active next-hop device is faulty includes one or more of the following cases: the active next-hop device itself is faulty, a communications link between the active next-hop device and the first network device is faulty, or the active next-hop device does not support BIER forwarding on the BIERv6 packet.

According to a second aspect, a first network device is provided, including:

a processing module, configured to determine that an active next-hop device for reaching a second network device is faulty, where the first network device is an ingress device in a BIER domain, the second network device is an egress device in the BIER domain, the first network device belongs to a first area in the BIER domain, the second network device and the active next-hop device belong to a second area in the BIER domain, the active next-hop device is a border device in the second area and is configured to connect to the first area, and the first area and the second area have different protocols; and a sending module, configured to send an Internet Protocol version 6-based bit index explicit replication BIERv6 packet to a backup next-hop device for reaching the second network device, where the backup next-hop device is a border device in the second area and is configured to connect to the first area.

In a possible implementation, the processing module is further configured to determine, based on a network topology of the BIER domain, the active next-hop device and the backup next-hop device for reaching the second network device.

In another possible implementation, the sending module is further configured to send a bidirectional forwarding detection BFD control packet to the active next-hop device, where a destination address of the BFD control packet is a first address of the active next-hop device, and the first address is used to direct the active next-hop device to perform BIER forwarding on the BIERv6 packet; and the processing module is further configured to: if a BFD control packet sent by the active next-hop device is not received in a preset time interval, determine that the active next-hop device is faulty.

In another possible implementation, that the active next-hop device is faulty includes one or more of the following cases: the active next-hop device itself is faulty, a communications link between the active next-hop device and the first network device is faulty, or the active next-hop device does not support BIER forwarding on the BIERv6 packet.

Beneficial effects of the second aspect and any possible implementation of the second aspect correspond to beneficial effects of the first aspect and any possible implementation of the first aspect, and details are not described herein again.

According to a third aspect, a first network device is provided, and the first network device has a function of implementing behavior of the first network device in the foregoing method. The function may be implemented based on hardware, or may be implemented based on hardware executing corresponding software. The hardware or the software includes one or more modules corresponding to the foregoing function.

In a possible design, a structure of the first network device includes a processor and an interface, and the processor is configured to support the first network device in executing a corresponding function in the foregoing method. The interface is configured to support the first network device in receiving a BIERv6 packet, or is configured to support the first network device in sending a BIERv6 packet to the backup next-hop device for reaching the second network device.

The first network device may further include a memory. The memory is configured to be coupled to the processor, and store program instructions and data that are necessary for the first network device.

In another possible design, the first network device includes a processor, a transmitter, a receiver, a random access memory, a read-only memory, and a bus. The processor is separately coupled to the transmitter, the receiver, the random access memory, and the read-only memory through the bus. When the first network device needs to be run, a bootloader in a basic input/output system or an embedded system that is fixed in the read-only memory is used to guide a system to be started, to guide the first network device to enter a normal running state. After entering the normal running state, the first network device runs an application program and an operating system in the random access memory, so that the processor performs the method in the first aspect or any possible implementation of the first aspect.

According to a fourth aspect, a first network device is provided. The first network device includes a main control board and an interface board, and may further include a switching board. The first network device is configured to perform the method in the first aspect or any possible implementation of the first aspect. Specifically, the first network device includes modules configured to perform the method in the first aspect or any possible implementation of the first aspect.

According to a fifth aspect, a first network device is provided. The first network device includes a control module and a first forwarding subdevice. The first forwarding subdevice includes an interface board, and may further include a switching board. The first forwarding subdevice is configured to execute a function of the interface board in the fourth aspect, and may further execute a function of the switching board in the fourth aspect. The control module includes a receiver, a processor, a transmitter, a random access memory, a read-only memory, and a bus. The processor is separately coupled to the receiver, the transmitter, the random access memory, and the read-only memory through the bus. When the control module needs to be run, a bootloader in a basic input/output system or an embedded system that is fixed in the read-only memory is used to guide a system to be started, to guide the control module to enter a normal running state. After entering the normal running state, the control module runs an application program and an operating system in the random access memory, so that the processor performs a function of the main control board in the fourth aspect.

It can be understood that in actual application, the first network device may include any quantity of interfaces, processors, or memories.

According to a sixth aspect, a computer program product is provided. The computer program product includes computer program code, and when the computer program code is run on a computer, the computer is enabled to perform the method performed in the first aspect or any possible implementation of the first aspect.

According to a seventh aspect, a computer-readable medium is provided. The computer-readable medium stores program code, and when the computer program code is run on a computer, the computer is enabled to perform the method performed in the first aspect or any possible implementation of the first aspect. The computer-readable medium includes but is not limited to one or more of the following: a read-only memory (read-only memory, ROM), a programmable ROM (programmable ROM, PROM), an erasable PROM (erasable PROM, EPROM), a Flash memory, an electrically EPROM (electrically EPROM, EEPROM), or a hard drive (hard drive).

According to an eighth aspect, a chip is provided. The chip includes a processor and a data interface, and the processor reads, through the data interface, instructions stored in a memory to perform the method in the first aspect or any possible implementation of the first aspect. In a specific implementation process, the chip may be implemented in a form of a central processing unit (central processing unit, CPU), a micro controller unit (micro controller unit, MCU), a micro processing unit (micro processing unit, MPU), a digital signal processor (digital signal processor, DSP), a system on chip (system on chip, SoC), an application-specific integrated circuit (application-specific integrated circuit, ASIC), a field programmable gate array (field programmable gate array, FPGA), or a programmable logic device (programmable logic device, PLD).

DESCRIPTION OF EMBODIMENTS

Figures 1, 2, 3:
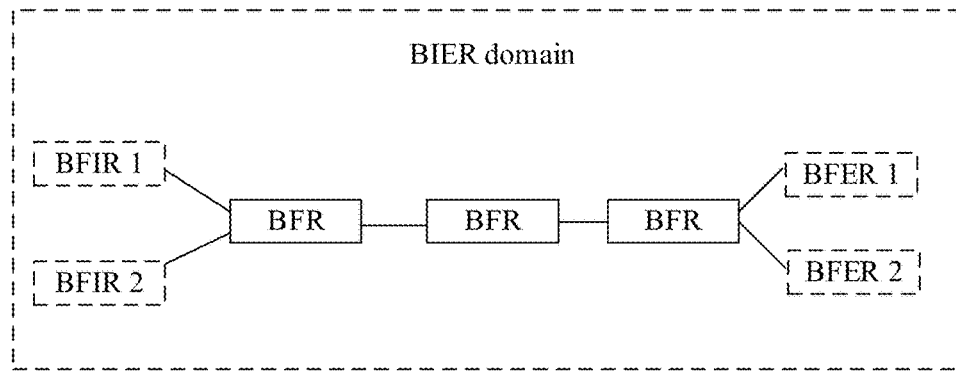
FIG. 1 is a schematic networking diagram of a BIER technology according to an embodiment of this application.
FIG. 2 is a schematic diagram of a possible BIER header form according to an embodiment of this application.
FIG. 3 is a schematic block diagram of another possible BIER header format.

The following describes technical solutions of this application with reference to accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example", "such as" in the embodiments of this application is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of this application, "corresponding (corresponding, relevant)", and "corresponding (corresponding)" sometimes may be used in a mixed manner. It should be noted that when a difference is not emphasized, meanings to be expressed by them are the same.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Reference to "one embodiment", "some embodiments", or the like described in the specification means that specific features, structures, or features described with reference to the embodiment are included in one or more embodiments of this application. Therefore, the statements "in one embodiment", "in some embodiments", "in some other embodiments", "in some other embodiments", and the like that appear in different parts of the specification unnecessarily mean reference to a same embodiment, but mean "one or more embodiments but not all embodiments", unless otherwise specifically emphasized in another manner. The terms "include", "comprise", "have", and variations thereof all mean "include but not be limited to", unless otherwise specifically emphasized in another manner.

In this application, "at least one" means one or more, and "a plurality of" means two or more. The term "and/or" describes an association relationship for describing associated objects and represents that three relationships may exist. For example, A and/or B may indicate a case in which only A exists, both A and B exist, and only B exists, where A and B may be singular or plural. The character "/" generally indicates an "or" relationship between the associated objects. "At least one of the following items" or a similar expression means any combination of these items, including any combination of a single item or a plurality of items. For example, at least one of a, b, or c may represent a, b, c, a-b, a-c, b-c, or a-b-c, where a, b, and c may be single, or may be multiple.

Multicast (multicast) is a data transmission manner of efficiently sending data to a plurality of receivers in a transmission control protocol (transmission control protocol, TCP)/Internet Protocol (Internet Protocol, IP) network at a same time by using one multicast address. A multicast source sends a multicast flow to a multicast group member in a multicast group through a link in the network. All multicast group members in the multicast group can receive the multicast flow. The multicast transmission manner implements a point-to-multipoint data connection between the multicast source and the multicast group members. The multicast flow needs to be transmitted only once on each network link, and the multicast flow is replicated only when the link has a tributary. Therefore, the multicast transmission manner improves data transmission efficiency and reduces a possibility that congestion occurs in a backbone network.

An Internet Protocol (IP) multicast technology implements highly efficient point-to-multipoint data transmission in an IP network, to effectively save on network bandwidth and reduce network load, and therefore is widely applied in a plurality of aspects such as real-time data transmission, multimedia conferencing, data copy, an Internet Protocol television (IPTV), a game, and simulation. In the multicast technology, a multicast tree is constructed on a control plane by using a multicast protocol, and then logic on a network plane is made to be tree-shaped by using the multicast tree, to implement multicast point-to-multipoint data forwarding. Each intermediate device using construction of a distribution tree as a core needs to maintain complex multicast forwarding information status. As a network scale is increasingly large and multicast data traffic increases over time, this multicast technology faces an increasingly large challenge in terms of costs and operation and maintenance.

Therefore, a new technology for constructing a multicast data forwarding path is proposed in the industry, which is referred to as a bit index explicit replication (bit index explicit replication, BIER) technology. The technology proposes a multicast technology architecture in which a multicast distribution tree does not need to be constructed. As shown in FIG. 1, a router supporting the BIER technology is referred to as a bit-forwarding router (Bit-forwarding router, BFR), and the BFR can receive and forward a BIER packet. A multicast forwarding domain including one or more BFRs is referred to as a BIER domain (BIER domain). At an ingress of the BIER domain, a BFR performing BIER encapsulation on an original multicast packet is referred to as a bit forwarding ingress router (bit forwarding ingress router, BFIR). At an egress of the BIER domain, a BFR obtaining an original multicast packet by decapsulating a BIER packet is referred to as a bit forwarding egress router (bit forwarding ingress router, BFER). It should be understood that the BFIR and the BFER in the BIER domain may be referred to as edge BFRs in the BIER domain.

For ease of understanding, a BIER-related technology is first described below in detail with reference to FIG. 2 to FIG. 5.

In the BIER domain, a globally unique bit position (bit position) identifier in an entire BIER sub-domain (sub-domain, SD) may be configured for the edge BFR. In an example, a value is configured for each edge BFR as a BFR identifier (BFR identifier, BFR ID). For example, the BFR ID may be a value ranging from 1 to 256. All BFR IDs in the BIER domain form a bit string (bit string).

In this embodiment of this application, when an original multicast packet needs to be transmitted in the BIER domain, a specific BIER header needs to be additionally encapsulated. All destination devices of the original multicast packet are marked in the BIER header by using the bit string. The BFR in the BIER domain may perform forwarding based on a bit index forwarding table (bit index forwarding table, BIFT) and the bit string that is carried in the BIER header, to ensure that the original multicast packet can be sent to all the destination addresses.

It should be noted that the destination device of the original multicast packet in this application may be a set of a plurality of BFERs. For ease of description, the set of a plurality of BFERs to which the original multicast packet needs to be sent is referred to as a destination device below.

It should be understood that the original multicast packet after the BIER header may be an Internet Protocol version 6 (Internet Protocol version 6, IPv6) multicast packet, or may be an Internet Protocol version 4 (Internet Protocol version 4, IPv4) multicast packet. This is not specifically limited in this application.

BIER encapsulation may be in various types. This is not specifically limited in this application. In one example, a BIER packet may be encapsulated through multiprotocol label switching (multiprotocol label switching, MPLS), and this encapsulation may be referred to as BIER-MPLS encapsulation. In another example, a BIER packet may be encapsulated based on the Internet Protocol version 6 (Internet Protocol version 6, IPv6), and this encapsulation may be referred to as BIERv6 encapsulation.

A technology related to BIER-MPLS encapsulation is described below in detail with reference to FIG. 2 to FIG. 4.

A BIER header format is not specifically limited in this embodiment of this application, provided that the BIER header includes a bit string (bit string) field. Two possible BIER header formats are respectively described below in detail with reference to FIG. 2 and FIG. 3.

FIG. 2 is a schematic block diagram of a possible BIER header format. As shown in FIG. 2, the BIER header may include but is not limited to a bit index forwarding table identifier (bit index forwarding table identifier, BIFT ID) with a length of 20 bits, a bit string length (bit string length, BSL), and other fields of 64 bits (8 bytes), for example, a traffic class (traffic class, TC), a stack (stack, S), a time to live (time to live, TTL) field, an entropy (entropy) field, a version number (version, Ver) field, a nibble (nibble) field, a protocol (protocol, proto) field, an operation, administration and maintenance (operation, administration and maintenance, OAM) field, a reserve (reserve, Rsv) field, and a differential service code point (differential service code point, DSCP) field that are of the original multicast packet after the BIER header.

The fields in the BIER header are separately described below in detail.

(1) BIFT ID Field

The BIFT ID field has a length of 20 bits, and is an MPLS label (label, L) in BIER-multiprotocol label switching (multiprotocol label switching, MPLS) encapsulation. The MPLS label may be referred to as a BIER label. Fields such as the TC/S/TTL following the BIER label are in a standard label coding format. The fields such as TC/S/TTL are separately described below, and details are not described herein.

A BIFT ID may be a BIFT-id, and may include a combination of a sub-domain (sub-domain, SD)/a bit string length (bit string length, BSL)/a set identifier (set identifier, SI). Different BIFT IDs may correspond to different SD/BSL/SI combinations.

It should be understood that different BIFT IDs may map out different SD/BSL/SI combinations. The BIER header format shown in FIG. 2 does not directly include fields SD/BSL/SI, the SD/BSL/SI are three implicit fields, and values of the SD/BSL/SI need to be mapped out based on the BIFT ID field.

1. Sub-Domain (Sub-Domain, SD)

One BIER domain may be divided and configured into different sub-domains SDs based on a requirement of an actual service scenario, to support a multi-topology feature and the like of an interior gateway protocol (interior gateway protocol, IGP). Each BIER domain needs to include at least one sub-domain, that is, a default sub-domain 0. When a plurality of sub-domains are obtained through division, all the sub-domains need to be configured for each BFR in the BIER domain. For example, the sub-domain 0 may be configured on each BFR in the BIER domain and default topology in a system is used, and a sub-domain 1 may be further configured on the BFR and a multicast topology is used.

Each sub-domain SD is represented by a sub-domain identifier (sub-domain identifier, SD-ID). For example, a value of the SD-ID is [0-255], and a length of the SD-ID is 8 bits. In an example, the BIER domain may be configured into different SDs based on different virtual private networks (virtual private network, VPN), and different VPNs are configured to use different SDs. For example, a VPN 1 uses the SD 0, and a VPN 2 uses the SD 1.

It should be noted that a plurality of VPNs may alternatively use a same SD. Different SDs in the BIER domain may be in one interior gateway protocol (interior gateway protocol, IGP) process or topology, or may not be in one IGP process or topology. This is not specifically limited in this embodiment of this application.

2. Bit String Length (Bit String Length, BSL)

The BSL is a length of a bit string included in the BIER header. The BSL may be is various types. This is not specifically limited in this embodiment of this application. A smallest BSL has 64 bits, the BSL may further sequentially have 128 bits, 256 bits, 512 bits, 1024 bits, and 2048 bits, and a largest BSL has 4096 bits. Specifically, the BSL is identified in a packet by 4 bits. For example, when the BSL has 64 bits, the BSL is identified in the packet by 0001; when the BSL has 128 bits, the BSL is identified in the packet by 0010; when the BSL has 512 bits, the BSL is identified in the packet by 0100; when the BSL has 1024 bits, the BSL is identified in the packet by 0101, and so on.

3. Set Identifier (Set Identifier, SI)

If a quantity of BFER devices in a network is greater than 256, to adapt to this case, BIER encapsulation includes not only a bit string, but also a set identifier (set identifier, SI). The SI is intended to divide numbers of the BIER devices into a plurality of different intervals, to support larger-scale network addressing.

The SI may be understood as a set including a plurality of edge BFRs in a network or including configured BFR IDs. In an example, the BSL has 256 bits, but there are more than 256 edge BFRs in a network, or there are more than 256 configured BFR IDs. In this case, these edge BFRs or BFR IDs need to be divided into different sets. For example, 256 edge BFRs whose BFR IDs ranges from 1 to 256 form a set 0 (a set index 0, or SI=0), and 256 edge BFRs whose BFR IDs ranges from 257 to 512 form a set 1 (a set index 1, or SI=1).

After receiving a BIER packet, the BFR in the BIER domain may determine, based on a BIFT ID in the BIER header, a specific SD to which the BIER packet belongs, a used BSL, and a set of a specific SI of the BSL to which the packet belongs.

Corresponding SD/BSL/SI combinations represented by several possible BIFT IDs are enumerated below:

BIFT ID=1: corresponding to SD 0, BSL 256, SI 0 // equivalent to SD 0/BSL 256/SI 0;

BIFT ID=2: corresponding to SD 0, BSL 256, SI 1 // equivalent to SD 0/BSL 256/SI 1;

BIFT ID=3: corresponding to SD 0, BSL 256, SI 2 // equivalent to SD 0/BSL 256/SI 2;

BIFT ID=4: corresponding to SD 0, BSL 256, SI 3 // equivalent to SD 0/BSL 256/SI 3;

BIFT ID=5: corresponding to SD 0, BSL 512, SI 0// equivalent to SD 0/BSL 512/SI 0;

BIFT ID=6: corresponding to SD 0, BSL 512, SI 1 // equivalent to SD 0/BSL 512/SI 1;

BIFT ID=7: corresponding to SD 1, BSL 256, SI 0 // equivalent to SD 1/BSL 256/SI 0;

BIFT ID=8: corresponding to SD 1, BSL 256, SI 1 // equivalent to SD 1/BSL 256/SI 1;

BIFT ID=9: corresponding to SD 1, BSL 256, SI 2 // equivalent to SD 1/BSL 256/SI 2;

BIFT ID=10: corresponding to SD 1, BSL 256, SI 3 // equivalent to SD 1/BSL 256/SI 3;

BIFT ID=11: corresponding to SD 1, BSL 512, SI 0 // equivalent to SD 1/BSL 512/SI 0; and BIFT ID=12: corresponding to SD 1, BSL 512, SI 1 // equivalent to SD 1/BSL 512/SI 1.

It should be noted that a value of the BIFT ID field corresponds to a triplet <SD, BSL, SI>. Unique <SD, BSL, SI> information can be obtained by using the BIFT-id field. The <SD, BSL, SI> information has the following functions: A length of a bit string in a BIER packet header is obtained by using the BSL, to know a length of the entire BIER packet header. Whether the bit string represents BFR-IDs ranging from 1 to 256 or ranging from 257 to 512 can be learned by using the BSL and SI information. A corresponding forwarding table can be found by using the SD information.

(2) Bit String (Bit String) Field

Each bit in a bit string is used to identify an edge BFR, for example, a bit in a lower position (rightmost) in the bit string is used to identify a BFER whose BFR-ID is equal to 1. A second bit from the right to the left in the bit string identifies a BFER whose BFR-ID is equal to 2. A forwarding entry based on which a forwarding plane performs forwarding determines, based on a bit string in a packet, several specific BFERs to which the packet is to be sent. When receiving a packet header including BIER header, the BFR in the BIER domain forwards the BIER packet based on a bit string and a BIFT ID that are carried in the BIER header.

It should be noted that a value 1 of a bit indicates that the packet needs to be sent to a BFER device represented by the BFR-ID, and a value 0 of the bit indicates that the packet does not need to be sent to the BFER device represented by the BFR-ID.

For example, BIFT ID=2. After receiving the BIER packet, the BFR may learn, based on the BIFT ID in the BIER header, that the BIER packet belongs to the SD 0, and a BSL used in the BIER header has 256 bits, and the BFR ID belongs to the set 1 (a set including 256 edge BFRs whose BFR IDs ranges from 257 to 512).

(3) Transmission Class (Traffic Class, TC) Field

The traffic class field is used to identify a priority of a packet.

(4) Stack (Stack, S)

S is a bottommost label. A value of the label is 1 in the BIER packet header. In other words, the MPLS label is a bottommost label of an entire label stack.

(5) Version Number (Version, Ver) Field

The version number field has a length of 4 bits, and is a version number of the IP. A value 4 of the version number field represents IPv4, and a value 6 of the version number field represents IPv6.

(6) Entropy (Entropy) Field

The entropy field is used for load sharing. Equivalent load sharing may be performed during BIER forwarding. In this case, during load sharing, a same path needs to be selected for two BIER packets with same entropy and a same bit string. To be specific, a plurality of packets belonging to same traffic has same entropy, and a plurality of packets with different traffic have different entropy. When a packet is forwarded, different traffic may be shared on different links based on entropy, and a plurality of packets having same traffic go through a same link.

To ensure different entropy identifies different flows, when a BFIR device allocates entropy, it is required that different entropy labels are allocated based on different flows, and the entropy cannot be repeated.

(7) Protocol (Protocol, Proto) Field

The protocol field is used to identify a payload (payload) format after the BIER packet header. For example, a value 4 and a value 6 respectively represent an IPv4 packet and an IPv6 packet. A value 2 represents an MPLS packet with an upstream allocated label, and the value 2 is a proto value used in a multicast virtual private network (multicast virtual private network, MVPN) over BIER. A reason for using an upstream label is as follows: Multicast is point-to-multipoint transmission. A provider edge (provider edge, PE) device at a transmit end may allocate a unique label, and send the unique label a PE device at a receive end by using a control plane. The label allocated by the PE device at the transmit end is used in a data packet, and is identified by the PE device at the receive end. The label is not allocated by the PE device at the receive end, but allocated by the PE device at the transmit end, and therefore is referred to as an upstream label.

(8) Nibble (Nibble)

The nibble field has a fixed 4-bit value 0101. This field is used to distinguish between services carried by MPLS, and distinguish between BIER, IPv4, and IPv6. Because in MPLS encapsulation and forwarding, an IPv4 or IPv6 header after a label stack is sometimes checked to support an ECMP.

(9) BFIR-Id

The BFIR-id is a BFR-ID of a BFIR. If a BFIR device encapsulates and sends a BIER packet by using a sub-domain, the BFIR-id field needs to be filled with a BFR-ID of the device in the sub-domain. The BFIR-id may identify a specific BFIR from which a multicast flow is sent, to uniquely determine a multicast flow.

(10) Bit String

The bit string is a string of a destination device set of a BIER packet.

FIG. 3 is a schematic block diagram of another possible BIER header format. Compared with the BIER header format shown in FIG. 2, the BIER header format shown in FIG. 3 does not include the BIFT-ID field, but explicitly includes the three fields SD/BSL/SI. In other words, the BIER header format shown in FIG. 3 directly includes the three fields SD/BSL/SI, and values of the SD/BSL/SI do not need to be mapped out by the BIFT ID field.

It should be noted that fields included in the BIER header format shown in FIG. 3 are similar to fields included in the BIER header format shown in FIG. 2. For specific descriptions related to the fields in the BIER header format shown in FIG. 3, refer to the descriptions in FIG. 2. Details are not described herein again.

A process of establishing a BIER forwarding table based on a BIER technology and forwarding a BIER packet based on the BIER technology is described below in detail by using FIG. 4 as an example.

Figure 4:
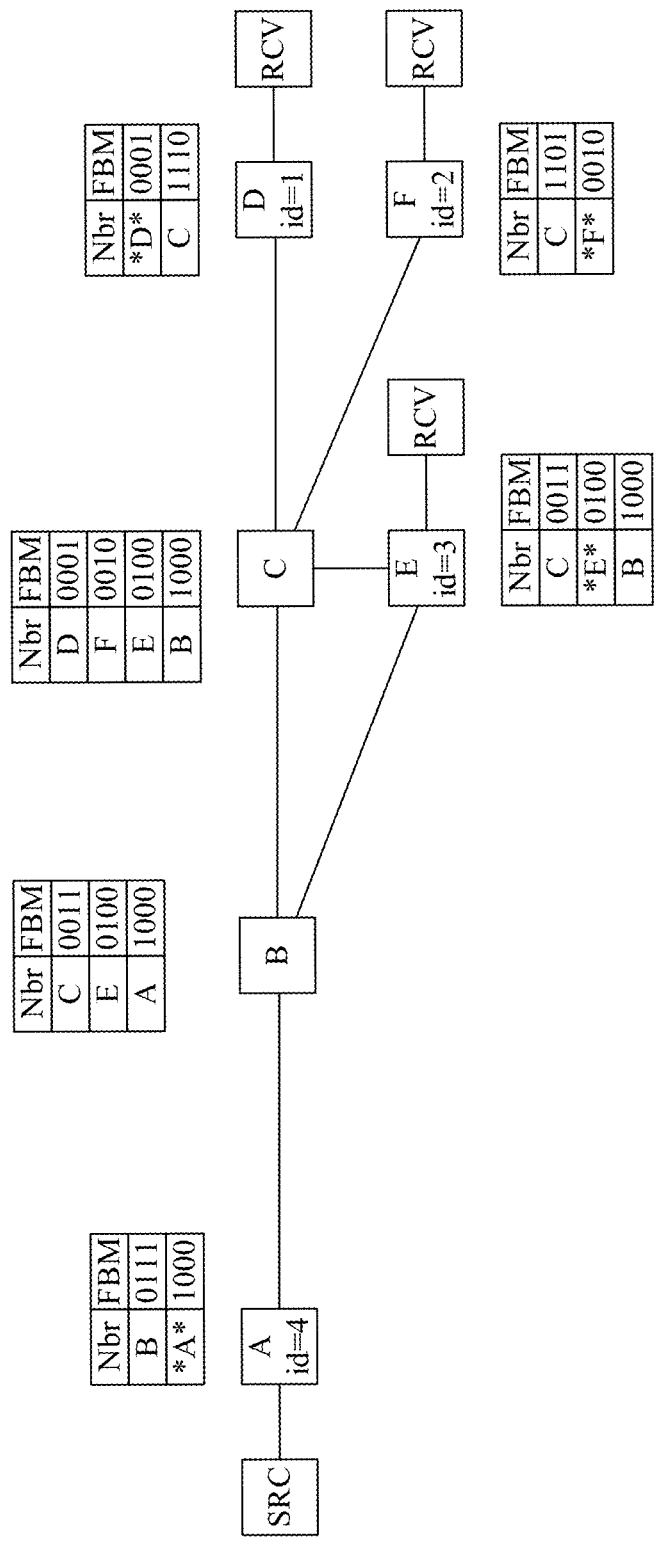
FIG. 4 is a process of establishing a BIER forwarding table based on a BIER technology and forwarding a BIER packet based on the BIER technology.

A BIER domain shown in FIG. 4 may include a device A to a device F. The device A, the device D, the device E, and the device F are edge BFRs in the BIER domain, and the device B and the device C are intermediate forwarding devices in BIER. Specifically, the device A is located at an ingress of the BIER domain and is responsible for performing BIER encapsulation on an original multicast packet, and corresponds to the BFIR in FIG. 1. The device D, the device E, and the device F are located at an egress of the BIER domain and are responsible for obtaining an original multicast packet by decapsulating a BIER packet, and corresponds to the BFERs in FIG. 1.

In this embodiment of this application, a unique BFR-ID may be allocated to each edge BFR in the BIER domain. For example, in FIG. 4, BFR-IDs configured for the device A, the device D, the device E, and the device F are respectively 4, 1, 3, and 2. No BFR-ID is allocated to the intermediate forwarding BFRs, for example, the device B and the device C.

It should be noted that in this embodiment of this application, "ID" and "id" sometimes may be used in a mixed manner. It should be noted that when a difference is not emphasized, meanings to be expressed by them are the same. The BFR-ID in this application may refer to an id in FIG. 4.

A bit string encapsulated in a BIER header of data traffic marks all destination devices of the traffic. For example, a bit string corresponding to the device D whose BFR-ID is 1 is 0001, a bit string corresponding to the device F whose BFR-ID is 2 is 0010, a bit string corresponding to the device E whose BFR-ID is 3 is 0100, and a bit string corresponding to the device A whose BFR-ID is 4 is 1000.

It should be understood that a BFR-ID value allocated to each edge BFR in the BIER domain may be flooded to another BFR in the BIER domain by using a routing protocol. Flooded BIER information further includes an IP address and encapsulation information of the edge BFR. For example, flooded BIER information of the device A carries an IP address and the BIFT-id of the device A. The BFR (for example, the device F in FIG. 4) in the BIER domain may establish a BIFT entry based on the flooded BIER information, so that after receiving a BIER packet, the device F in FIG. 4 forwards the BIER packet to a destination device based on the established BIFT entry.

If the device A needs to send a BIER packet to BFERs whose BFR-IDs are respectively 1, 2, and 3, the device A needs to first send the BIER packet to a neighbor (the device B) of the device A, where an edge BFR whose BFR-ID is 4 is the device A. Therefore, a BIFT entry established by the device A is as follows:

Forwarding entry 1: A neighbor (neighbor, Nbr)=B, and a forwarding bit mask (forwarding bit mask, FBM)=0111; and Forwarding entry 2: Nbr*=A, and FBM=1000.

The forwarding entry 1 is used to indicate that when any one of a first bit, a second bit, or a third bit from the right to the left of a bit string in the BIER packet is 1, the BIER packet is sent to the neighbor (the device B) of the device A, where Nbr=B indicates that the neighbor of the device A is the device B.

The forwarding entry 2 is used to indicate that when a fourth bit from the right to the left of the bit string in the BIER packet is 1, the BIER packet is sent to the device A. Because the device A is the device A, the device A strips out a BIER header and forwards the BIER packet based on information in an original multicast packet. It should be noted that in the forwarding entry 2, * is used to identify that the Nbr is the device itself. For example, for the device A, Nbr*=A indicates that a neighboring device of the device A is the device A. Similarly, another device in FIG. 4 may also establish a BIFT entry based on a neighboring device of the another device. For the BIFT entry established by the another device, refer to FIG. 4. Details are not described herein.

After receiving an original multicast packet serving as an ingress BFIR in the BIER domain, the device A encapsulates a BIER header before the original multicast packet. It should be understood that, for ease of description, the device A is referred to as an ingress device A below. In an example, after receiving the original multicast packet, the ingress device A may learn a destination device of the original multicast packet based on a BFR-ID flooded by using a border gateway protocol BGP message. For example, receivers of the original multicast packet are as follows: A destination device whose BFR-ID 3 is E, a destination device whose BFR-ID is 2 is F, and a destination device whose BFR-ID is 1 is D. A bit string used by the ingress device A to encapsulate the BIER header is 0111, and the ingress device A forwards a BIER packet obtained after encapsulation to the neighboring device B based on the forwarding entry 1. After receiving the BIER packet, the device B determines, based on the bit string 0111 and the BIFT entry, that the BIER packet needs to be separately sent to the device C and the device E. When sending the BIER packet to the device C, the device B may perform an AND operation between the bit string (0111) in the BIER header and the FBM field corresponding to Nbr=C in the BIFT entry. An AND result in this embodiment of this application is 0011. Therefore, the device B may modify the bit string in the BIER header to 0011, and send the BIER packet to the device C. Similarly, when sending the BIER packet to the device E, the device B may modify the bit string in the BIER header to 0100. After receiving the BIER packet, the device E determines, based on the bit string 0100, that the BIER packet needs to be sent to the neighboring device E. The device E determines, based on the identifier * in a forwarding entry, that the neighboring device E is the device E. Therefore, serving as an egress BFER in the BIER domain, the device E may obtain the original multicast packet by decapsulating the BIER packet, and forward the original multicast packet in the inner-layer original multicast packet.

In BIER-MPLS encapsulation, the first 32 bits in the BIER header is an MPLS label code, and the first 20 bits in the first 32 bits is an MPLS label value. The MPLS label value changes in a forwarding process. For example, when the ingress device A sends a packet to the device B, an MPLS label value of the device B needs to be encapsulated. When the device B sends a packet to the device C, an MPLS label value of the device C needs to be encapsulated. In this embodiment of this application, MPLS label values allocated to the device A/device B/device C/device D/device E/device F are respectively 100/200/300/400/500/600. These MPLS label values need to be added to the foregoing BIER information and flooded to another BFR in the BIER domain by using a routing protocol, so that the device A can learn the MPLS label value of the device B. An MPLS label that identifies the BIER information is also referred to as a BIER label.

A technology related to BIERv6 encapsulation is described below in detail with reference to FIG. 5.

It should be understood that BIERv6 encapsulation is a solution formed by combining advantages of Native IPv6 and BIER. A packet format in BIERv6 encapsulation is: IPv6 header+BIER header+original multicast packet. The BIER header may be included in an IPv6 extension header, and the original multicast packet is used as payload (payload) of an outer-layer IPv6 header.

In this encapsulation, the IPv6 header and the IPv6 extension header that includes the BIER header jointly constitute an outer-layer packet header of an inner-layer original multicast packet, and the outer-layer packet header may also be referred to as a BIERv6 header in this embodiment of this application.

The IPv6 extension header including the BIER header is not specifically limited in this embodiment of this application. For example, the IPv6 extension header may be a destination option header (destination option header, DOH). For another example, the IPv6 extension header may be a routing header (routing header, RH).

Figure 5:
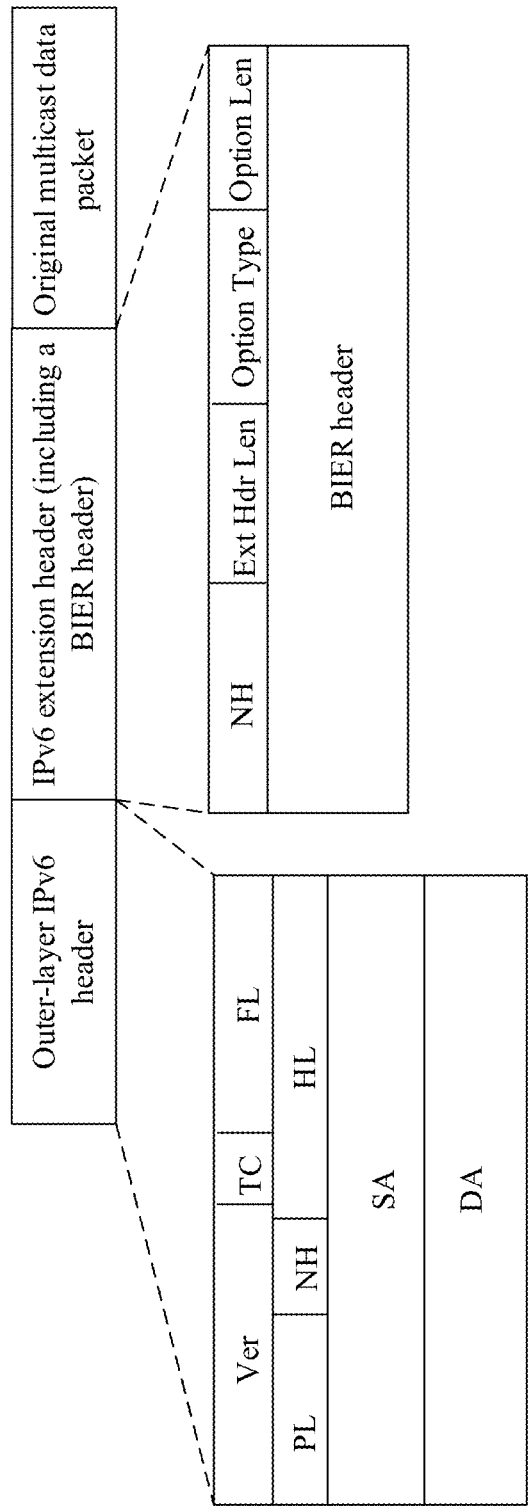
FIG. 5 is a schematic diagram of a possible packet format in BIERv6 encapsulation according to an embodiment of this application.

FIG. 5 is a schematic block diagram of possible BIERv6 encapsulation. Referring to FIG. 5, the BIER header may be located in the IPv6 extension header, for example, located in the DOH.

It should be understood that an option in the DOH is a type-length-value (type-length-value, TLV) format. The BIER header is used as Option data in the Option TLV of the DOH, an Option type in the Option TLV identifies a format of the BIER header, and an Option length in the Option TLV identifies a length of the BIER header.

It should be noted that in BIERv6 encapsulation, a format of the BIER header in the DOH is not specifically limited in this embodiment of this application, provided that the BIER header includes a bit string field. The BIER header format may be the format shown in FIG. 2, the format shown in FIG. 3, or another format. For example, in BIERv6 encapsulation, a proto field, a DSCP field, and the like may be further deleted from the BIER header, provided that the BIER header includes a bit string (bit string) used for bit index explicit replication. For specific detailed descriptions related to the BIER header format, refer to the descriptions in FIG. 2 or FIG. 3. Details are not described herein again.

Fields included in the outer-layer IPv6 header are described below in detail.

Version number (version, Ver): The version number is a version number of the IP, and a value 6 of the version number represents IPv6.

Traffic class (traffic class, TC) field: The traffic class field identifies a priority of a packet.

Flow label (flow label, FL) field: A same flow label may be used to label a plurality of packets belonging to same traffic, and another flow label value is used to label a plurality of packets having different traffic. When a packet is forwarded, different traffic may be shared on different links based on a flow label, and a plurality of packets having same traffic go through a same link. To be specific, the flow label is used to distinguish between real-time traffic, and different flow labels may determine different data flows. In this way, a network device in a BIER domain may more efficiently distinguish between different data flows based on the flow label field;

Payload length (payload length, PL) field: The payload length field indicates a length of a packet.

Next header (Next Header, NH) field: The next header field indicates a type of a next header of a packet, for example, may represent an IPv6 extension header.

Hop limit (Hop Limit, HL) field: The hop limit field indicates a quantity of packets.

Source address (source address, SA) field: The source address field identifies a source address of a packet.

Destination address (destination address, DA) field: The destination address field identifies a destination address of a packet.

The BIER domain shown in FIG. 4 is used as an example. After receiving a user multicast packet serving as a header node (an ingress device) in an IPv6 network, the device A encapsulates the packet after a BIERv6 header, that is, after an outer-layer IPv6 header and an IPv6 extension header including a BIER header, to obtain an encapsulated BIERv6 packet. A BIERv6 packet header included in the IPv6 extension header carries a bit string indicating a destination device set.

The device A sends the encapsulated BIERv6 packet to B based on the BIERv6 packet header and the bit string information of the BIERv6 packet header. When sending the encapsulated BIERv6 packet, the device A may use a unicast address (for example, B::100) of B in a destination address field in the IPv6 header. The device B sends the packet to C and E based on the BIERv6 packet header and the bit string information of the BIERv6 packet header. When sending the packet, the device B may use a unicast address (for example, C::100) of C and a unicast address (for example, E::100) of E in the destination address field in the IPv6 header. Similarly, the device C sends the packet to D and F based on the BIERv6 packet header and the bit string information of the BIERv6 packet header. When sending the packet, the device C may use a unicast address (for example, D::100) of D and a unicast address (for example, F::100) of F in the destination address field in the IPv6 header.

In this embodiment of this application, a bit position configured for the edge BFR is flooded in advance in the BIER domain by using an interior gateway protocol (interior gateway protocol, IGP) or a border gateway protocol (border gateway protocol, BGP), so that each BFR in the BIER domain forms a bit index forwarding table (bit index forwarding table, BIFT) used to guide forwarding of an original multicast packet in the BIER domain. The information flooded in the BIER domain by using the IGP or the BGP may be referred to as BIER information. When receiving the BIERv6 packet encapsulated with the BIER header, the BFR forwards the BIERv6 packet to a destination node based on the BIFT entry.

In this embodiment of this application, the interior gateway protocol IGP may include but is not limited to an open shortest path first (open shortest path first, OSPF) protocol, an intermediate system to intermediate system (intermediate system to intermediate system, IS-IS) protocol, and the like.

It should be understood that the BIER domain (BIER domain) refers to a network area in which the BIER information can be flooded by using the IGP or the BGP and the BIFT entry can be established, and the BIER domain includes a BFIR and a BFER. The BIER information may include but is not limited to the BFR ID of each of the foregoing edge BFRs. In an example, if in an autonomous system (autonomous system, AS) domain, the IGP is deployed and the BIER information is flooded, the AS domain is a BIER domain (BIER domain). The BIER information is not flooded between a plurality of AS domains.

Generally, when a network is in a relatively large scale, one BIER domain is divided into a plurality of AS domains, and different protocols are deployed in the AS domains. For example, one BIER domain is divided into two AS domains, where the IGP is deployed in one AS domain and the BGP is deployed in the other AS domain.

Figure 6:
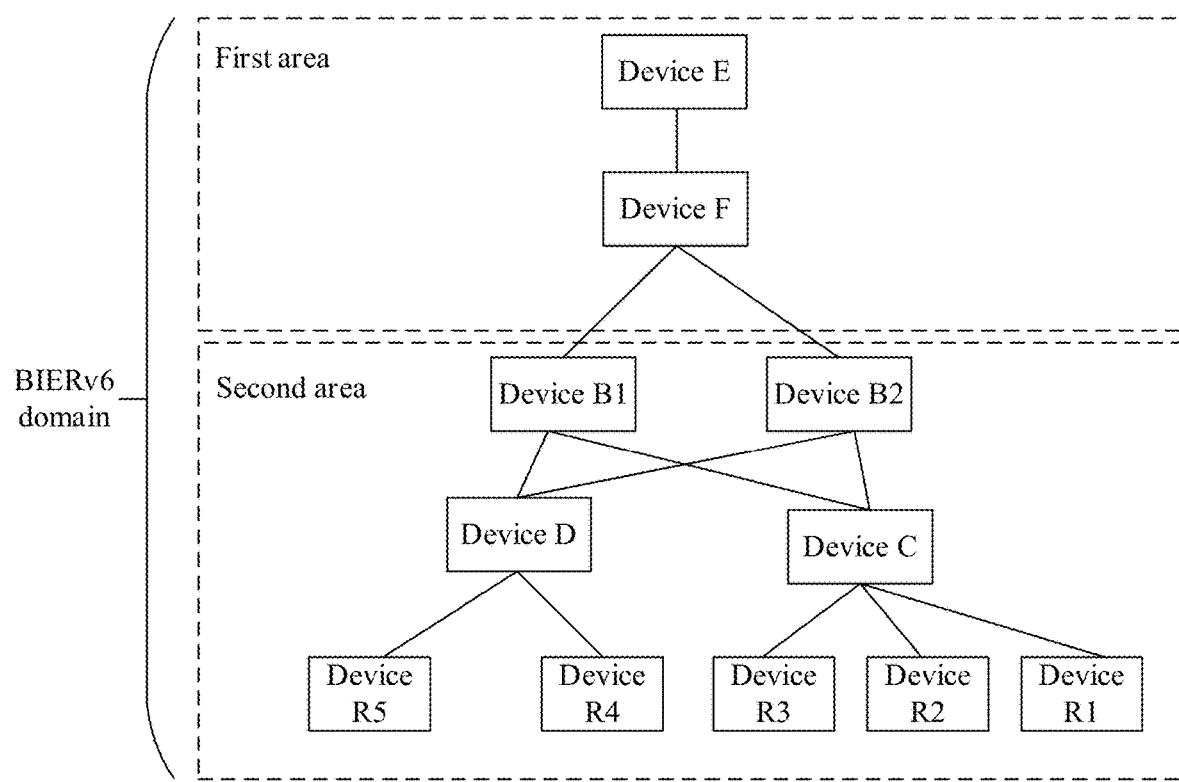
FIG. 6 is a schematic scenario diagram of a multiarea applicable to an embodiment of this application.

FIG. 6 is a schematic scenario diagram of a multiarea applicable to an embodiment of this application.

A device E serves as an ingress device (corresponding to the BFIR in FIG. 1) in a BIER domain to perform BIER encapsulation on an original multicast packet, to obtain a BIERv6 packet. A device F, a device B1, a device B2, a device C, and a device D serve as BFRs in the BIER domain, and forward the BIERv6 packet based on BIER header information in the BIERv6 packet. Devices R1, R2, R3, R4, and R5 serve as egress devices (corresponding to the BFERs in FIG. 1) in the BIER domain to decapsulate the BIERv6 packet, and forward a multicast packet obtained after decapsulation.

For ease of description, that the BIER domain includes two areas (a first area and a second area) is used as an example in FIG. 6 for description. The first area includes the ingress device in the BIER domain, and the second area includes the egress device in the BIER domain. For example, the first area includes the device E and the device F, and the second area includes the device B1, the device B2, the device C, the device D, and the devices R1, R2, R3, R4, and R5.

The first area and the second area in the BIER domain are not specifically limited in this embodiment of this application, provided that the first area and the second area have different protocols. In an example, the IGP is deployed in the first area in the BIER domain, and the BGP is deployed in the second area in the BIER domain.

It should be understood that in FIG. 6, the device F may serve as a border device in the first area and is configured to connect the first area and the second area. The device B1 or the device B2 may serve as border devices in the second area and are configured to connect the second area and the first area.

It should be noted that the device F may be a device different from or the same as the device B1 and the device B2. This is not specifically limited in this application. If the device F is a device that is the same as the device B1 and the device B2, the device belongs to both the first area in the BIER domain and the second area in the BIER domain.

As shown in FIG. 6, BIER information (including a BFR ID) of the devices R1 to R5 is flooded in advance in the second area by using an IGP routing protocol or a BGP routing protocol, so that the device in the second area forms, based on the BIER information, a bit index forwarding table (bit index forwarding table, BIFT) used to guide forwarding of a BIERv6 packet in the second area. When receiving a BIERv6 packet encapsulated with a BIER header, the device in the second area forwards the BIERv6 packet to the devices R1 to R5 based on a BIFT entry.

Because the first area and the second area belong to different AS domains, and the BIER information is not flooded between different AS domains, the device E in the first area cannot receive the BIER information (including the BFR ID) flooded by the devices R1 to R5, and the device E cannot form, based on the BIER information, a BIFT used to guide forwarding of a BIERv6 packet in the first area. Therefore, a next hop for reaching the devices R1 to R5 in the second area needs to be statically configured on the device E in the first area. The next hop is a border device that is in the second area and that is configured to connect to the first area. The device E in the first area sends, based on the configured next hop for reaching the devices R1 to R5, a BIERv6 packet to the next hop in the second area, and then the next hop in the second area performs BIER forwarding on the BIERv6 packet based on an established BIFT.

For example, the next hop that is on the device E and that is for reaching the devices R1 to R5 is the device B1 in the second area. If the device B1 in the second area is faulty, the device E in the first area cannot send the BIERv6 packet to the device B1 based on the configuration, and the BIERv6 packet in the first area cannot be forwarded to the second area, causing traffic interruption between the first area and the second area in the BIER domain.

In view of this, the embodiments of this application provide a method for forwarding a BIERv6 packet, so that the BIERv6 packet can be forwarded when the device B1 is faulty, to forward the BIERv6 packet in the first area to the second area, thereby avoiding traffic interruption between the first area and the second area in the BIER domain.

Figure 7:
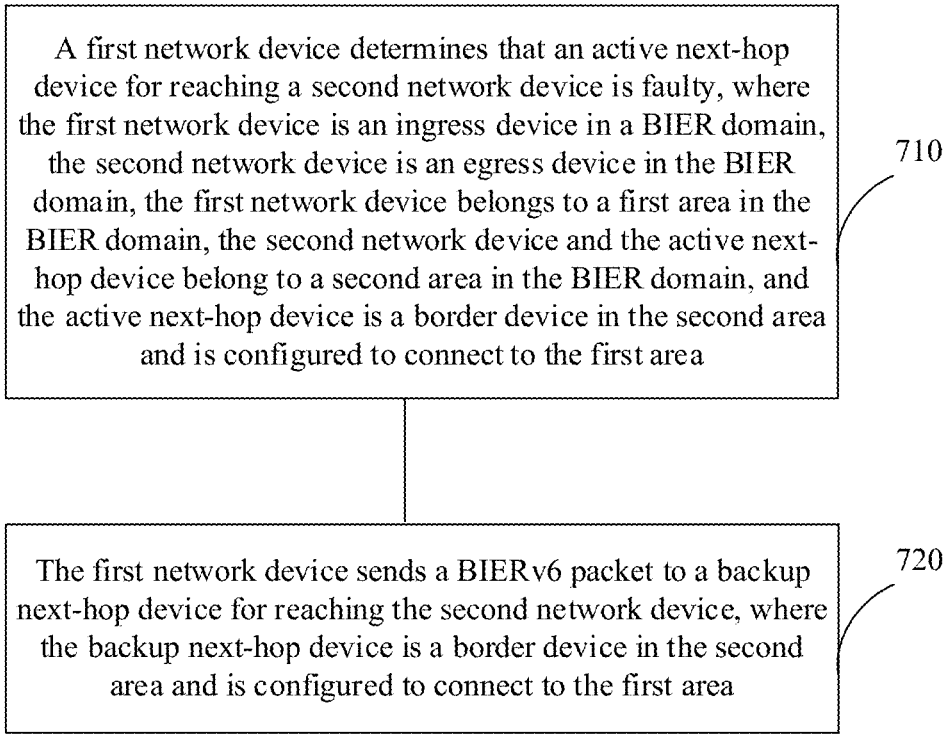
FIG. 7 is a schematic flowchart of a method for forwarding a BIERv6 packet according to an embodiment of this application.

FIG. 7 is a schematic flowchart of a method for forwarding a BIERv6 packet according to an embodiment of this application. Referring to FIG. 7, the method may include steps 710 and 720. The steps 710 and 720 are separately described below in detail.

Step 710: A first network device determines that an active next-hop device for reaching a second network device is faulty, where the first network device is an ingress device in a BIER domain, the second network device is an egress device in the BIER domain, the first network device belongs to a first area in the BIER domain, the second network device and the active next-hop device belong to a second area in the BIER domain, and the active next-hop device is a border device in the second area and is configured to connect to the first area.

The first network device is the ingress device in the BIER domain, corresponds to the device E in FIG. 6, and belongs to the first area in the BIER domain. The second network device is the egress device in the BIER domain, corresponds to the devices R1 to R5 in FIG. 6, and belongs to the second area in the BIER domain.

The active next-hop device belongs to the second area in the BIER domain, and is a border device that supports BIERv6 forwarding in the second area and is configured to connect to the first area. For example, the active next-hop device may correspond to the device B1 in FIG. 6.

It should be understood that in this embodiment of this application, the first area and the second area in the BIER domain have different protocols. For details, refer to descriptions of the first area and the second area in FIG. 6. Details are not described herein again.

In this embodiment of this application, there are a plurality of implementations in which the first network device determines that the active next-hop device for reaching the second network device is faulty. The implementations are described below in detail with reference to specific embodiments. Details are not described herein.

It should be understood that in this embodiment of this application, the active next-hop device is faulty may be understood as: The active next-hop device itself is faulty, the active next-hop device cannot perform BIERv6 forwarding, or a link between the active next-hop device and the first network device is faulty.

Step 720: The first network device sends a BIERv6 packet to a backup next-hop device for reaching the second network device, where the backup next-hop device is a border device in the second area and is configured to connect to the first area.

In a scenario in which the active next-hop device through which the first network device reaches the second network device is faulty, the first network device may send the BIERv6 packet to the backup next-hop device for reaching the second network device. The backup next-hop device also belongs to the second area in the BIER domain, and is a border device that supports BIERv6 forwarding in the second area and is configured to connect to the first area. For example, the backup next-hop device may correspond to the device B2 in FIG. 6.

It should be understood that the backup next-hop device serves as a protection device of the active next-hop device. When the active next-hop device is normal, the first network device sends the BIERv6 packet to the second network device by using the active next-hop device. When the active next-hop device is faulty, the first network device may send the BIERv6 packet to the second network device by using the backup next-hop device.

In the foregoing technical solution, when the active next-hop device through which the first network device in the first area in the BIER domain reaches the second area in the BIER domain is faulty, a border device connecting to the first area through the second area may be set as the backup next-hop device of the first network device. In this way, the first network device in the first area may forward the BIERv6 packet from the first area to the second area by using the backup next-hop device, so that when the active next-hop device in the second area in the BIER domain is faulty, traffic in the first area in the BIER domain is forwarded to the second area in the BIER domain, thereby avoiding interruption of traffic from the first area in the BIER domain to the second area in the BIER domain.

The method for forwarding a BIERv6 packet provided in the embodiments of this application is described below in detail with reference to FIG. 8 by using a scenario shown in FIG. 6 as an example.

Figure 8:
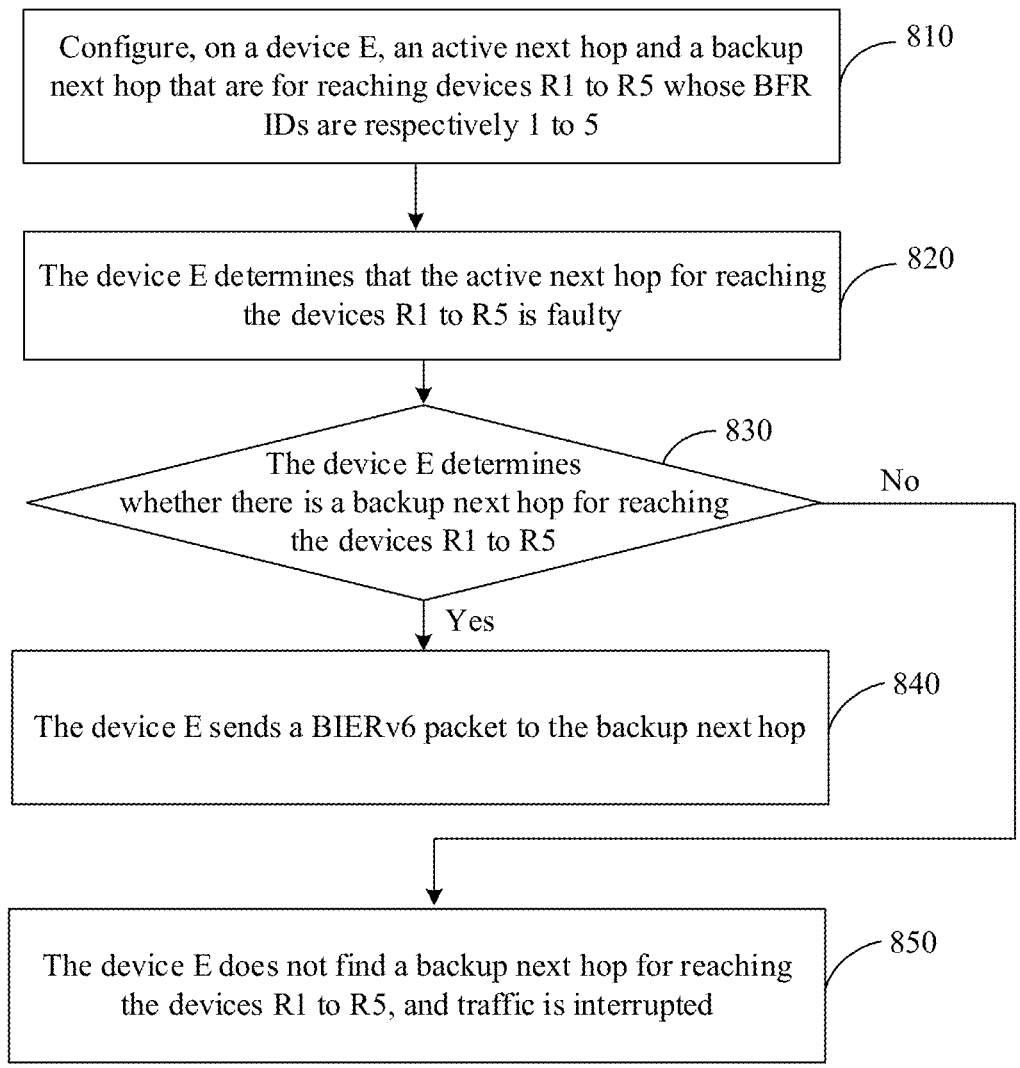
FIG. 8 is a schematic flowchart of another method for forwarding a BIERv6 packet according to an embodiment of this application.

It should be noted that the example in FIG. 8 is merely intended to help a person skilled in the art understand the embodiments of this application, and is not intended to limit the embodiments of this application to a specific value or a specific scenario of the example. A person skilled in the art can apparently make various equivalent modifications or changes according to the examples shown in FIG. 8, and such modifications or changes also fall within the scope of the embodiments of this application.

FIG. 8 is a schematic flowchart of another method for forwarding a BIERv6 packet according to an embodiment of this application. As shown in FIG. 8, the method may include steps 810 to 850. The steps 810 to 850 are separately described below in detail.

Step 810: Configure, on the device E, an active next hop and a backup next hop for reaching the devices R1 to R5 whose BFR IDs are respectively 1 to 5.

In this embodiment of this application, to avoid occurrence of traffic interruption, the active next hop and the backup next hop for reaching the devices R1 to R5 whose BFR IDs are respectively 1 to 5 are configured on the device E. When the active next hop is not faulty, the device E sends, through a path of the active next hop, a BIERv6 packet to the devices R1 to R5 whose BFR IDs are respectively 1 to 5. When the active next hop is faulty, the device E sends, through a path of the backup next hop, the BIERv6 packet to the devices R1 to R5 whose BFR IDs are respectively 1 to 5.

There are a plurality of specific implementations in which the device E determines the active next hop and the backup next hop for reaching the devices R1 to R5. In a possible implementation, the device E may determine, based on a network topology, the active next hop and the backup next hop for reaching the devices R1 to R5, to properly plan a multicast forwarding path, and implement optimal forwarding.

In an example, a network topology shown in FIG. 6 is used as an example. To implement optimal forwarding, on the device E, the device B1 may be configured as the active next hop for reaching the devices R1 to R5, and the device B2 may be configured as the backup next hop for reaching the devices R1 to R5.

A possible configuration on the device E in this implementation is enumerated below:

bfd BierE_B1 bind peer-ipv6 200:B1:1::1 source-ipv6 100:E:1::
  discriminator local 1
  discriminator remote 2
bfd BierE_B2 bind peer-ipv6 200: B2:1::1 source-ipv6 100:E:1::
  discriminator local 1
  discriminator remote 3
bier
  bfr-neighbor end-bier 200:B1:1::1 bfr-id 1 to 5 track bfd BierE_B1 bfr-neighbor end-bier 200:B2:1::1 bfr-id 1 to 5 backup track bfd BierE_B2

In the foregoing configuration, "bfd BierE_B1 bind peer-ipv6 200:B1:1::1 source-ipv6 100:E:1::" indicates that a next hop of the device E is the device B1, the address 200:B1:1::1 is an End.BIER address of the device B1, and the address 100:E:1:: is an End.BIER address of the device E; and "bfd BierE_B2 bind peer-ipv6 200:C:1::1 source-ipv6 100:E:1::" indicates that the next hop of the device E is the device B2, the address 200:B2:1::1 is an End.BIER address of the device B2, and the address 100:E:1:: is the End.BIER address of the device E.

It should be understood that the End.BIER address is not a common IPv6 address, but a specific IPv6 address that is on a device and that is used to process the BIERv6 packet. The device B is used as an example. After the End.BIER address is configured on the device B, a forwarding entry with a 128-bit mask is formed for the address in a forwarding information base (forwarding information base, FIB), and the forwarding entry identifies that the address is End.BIER. When receiving an IPv6 packet, the device B first searches the FIB for a destination address. When a result of searching the FIB is that the destination address is an End.BIER address, the device B performs an End.BIER-specific action, that is, continues to process a BIER header in an IPv6 extension packet header. Alternatively, if the destination address is a common IPv6 destination address, the result of searching the FIB indicates that the packet is an IPv6 packet that is sent to a current router and that includes a destination option extension packet header. In this case, the packet may be sent to a CPU for processing, and cannot be processed on a data plane.

It should be noted that End.BIER is merely used to direct the device to process the BIERv6 packet, and BIER forwarding depends on a BIERv6 packet header in an extension packet header, including determining, based on a BIFT-id field in the BIERv6 packet header, specific <SD, BSL, SI>to which the packet belongs; and then determining, based on a bit string, a specific BFER node that is of which SI and to which the packet is to be sent.

In the foregoing configuration, "bfr-neighbor end-bier 200:B1:1::1 bfr-id 1 to 5 track bfd BierE_B1" indicates that the active next hop that is on the device E and that is for reaching the devices R1 to R5 whose BFR IDs are respectively 1 to 5 is the device B1; and "bfr-neighbor end-bier 200:B2:1::1 bfr-id 1 to 5 backup track bfd BierE_B2" indicates that the backup next hop that is on the device E and that is for reaching the devices R1 to R5 whose BFR IDs are respectively 1 to 5 is the device B2.

In another example, a network topology shown in FIG. 6 is used as an example. It is assumed that only the device B1 and the device C in the second area support BIERv6 forwarding. To implement optimal forwarding, on the device E, the device B1 may be configured as the active next hop for reaching the devices R1 to R5, the device C may be configured as a backup next hop for reaching the devices R1 to R3, the device R4 may be configured as a backup next hop for reaching the device R4, and the device R5 may be configured as a backup next hop for reaching the device R5. In other words, leaf nodes (for example, the device R4 and the device R5) may serve as backup next hops of the device E.

A possible configuration on the device E in this implementation is enumerated below:
bfd BierE_B bind peer-ipv6 200:B1:1::1 source-ipv6 100:E:1::
discriminator local 1
discriminator remote 2
bfd BierE_C bind peer-ipv6 200:C:1::1 source-ipv6 100:E:1::
discriminator local 1
discriminator remote 3
bier
bfr-neighbor end-bier 200:B1:1::1 BFR-id 1 to 5 track bfd BierE_B1
bfr-neighbor end-bier 200:C:1::1 BFR-id 1 to 3 backup track bfd BierE_C
bfr-neighbor end-bier 200:D4:1::1 BFR-id 4 backup
bfr-neighbor end-bier 200:D5:1::1 BFR-id 5 backup In the foregoing configuration, "bfr-neighbor end-bier 200:D4:1::1 BFR-id 4 backup" indicates that the backup next hop that is on the device E and that is for reaching the device R4 whose BFR ID is 4 is the device R4 (the device R4), and "bfr-neighbor end-bier 200:D5:1::1 BFR-id 5 backup" indicates that the backup next hop that is on the device E and that is for reaching the device R5 whose BFR ID is 5 is the device R5 (the device R5).

Figure 9:
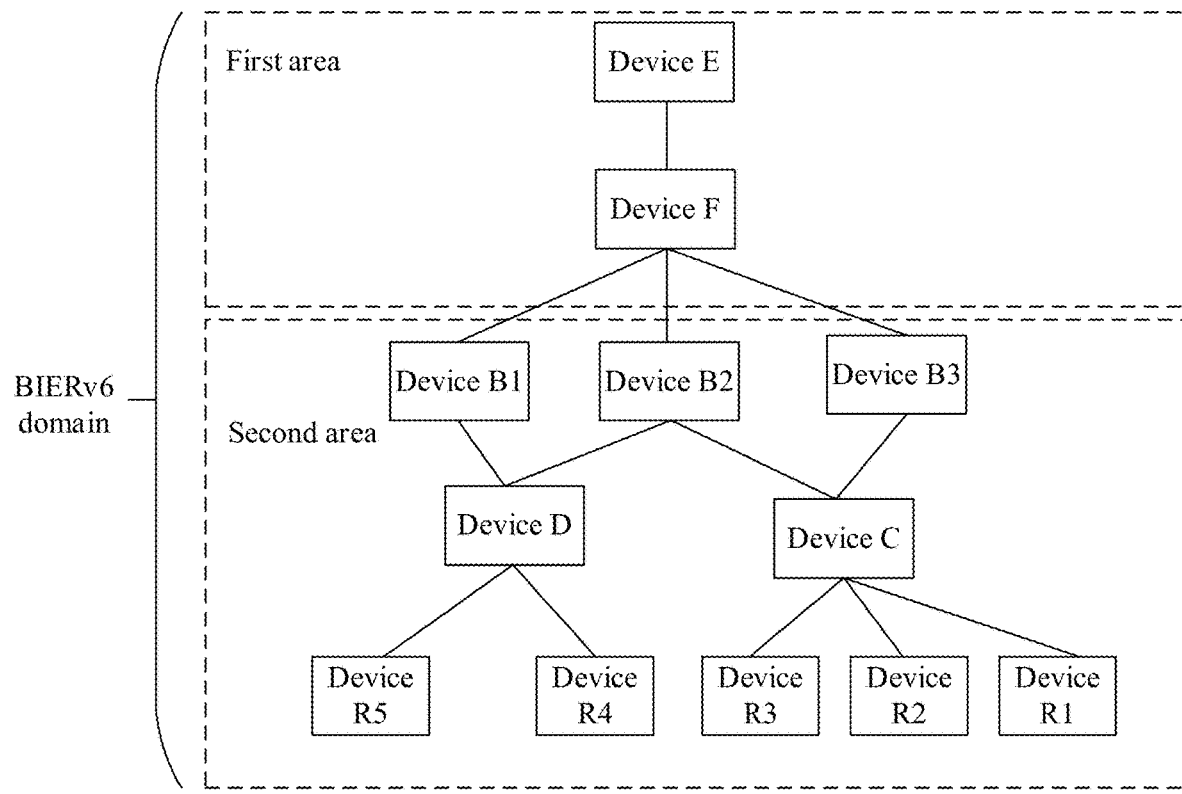
FIG. 9 is a schematic diagram of a network topology of another multiarea according to an embodiment of this application.

In another example, a network topology shown in FIG. 9 is used as an example. The first area may include a plurality of ASBRs, for example, the device B1, the device B2, and the device B3. To implement optimal forwarding, on the device E, based on the network topology, the device B2 and the device B3 may be respectively configured as primary and backup next hops for reaching the devices R1 to R3, and the device B1 and the device B2 may be respectively configured as primary and backup next hops for reaching the device R4 and the device R5.

A possible configuration on the device E in this implementation is enumerated below:
bfd BierE_B1 bind peer-ipv6 200:B1:1::1 source-ipv6 100:E:1::
discriminator local 1
discriminator remote 2
bfd BierE_B2 bind peer-ipv6 200:B2:1::1 source-ipv6 100:E:1::
discriminator local 1
discriminator remote 3
bfd BierE_B3 bind peer-ipv6 200:B3:1::1 source-ipv6 100:E:1::
discriminator local 1
discriminator remote 4
bier
bfr-neighbor end-bier 200:B1:1::1 BFR-id 1 to 3 track bfd BierE_B3
bfr-neighbor end-bier 200:B2:1::1 BFR-id 1 to 3 backup track bfd BierE_B2
bfr-neighbor end-bier 200:B2:1::1 BFR-id 4 to 5 track bfd BierE_B2
bfr-neighbor end-bier 200:B3:1::1 BFR-id 4 to 5 backup track bfd BierE_B1

In the foregoing configuration, "bfr-neighbor end-bier 200:B1:1::1 BFR-id 1 to 3 track bfd BierE_B3" indicates that the active next hop that is on the device E and that is for reaching the devices R1 to R3 is the device B3, "bfr-neighbor end-bier 200:B2:1::1 BFR-id 1 to 3 backup track bfd BierE_B2" indicates that the backup next hop that is on the device E and that is for reaching the devices R1 to R3 is the device B2, "bfr-neighbor end-bier 200:B2:1::1 BFR-id 4 to 5 track bfd BierE_B2" indicates that the active next hop that is on the device E and that is for reaching the device R4 and the device R5 is the device B2, and "bfr-neighbor end-bier 200:B3:1::1 BFR-id 4 to 5 backup track bfd BierE_B1" indicates that the backup next hop that is on the device E and that is for reaching the device R4 and the device R5 is the device B1.

In the foregoing technical solution, different primary next hops and backup next hops may be flexibly deployed on the device E for different BFR IDs based on the network topology, to properly plan a multicast forwarding path and implement optimal forwarding.

Step 820: The device E determines that the active next hop for reaching the devices R1 to R5 is faulty.

For ease of description, the scenario shown in FIG. 6 is used as an example below. The active next hop that is configured on the device E and that is for reaching the devices R1 to R5 whose BFR IDs are respectively 1 to 5 is the device B1.

In this embodiment of this application, that the device B1 is faulty may be understood as: The device B1 itself is faulty, a link between the device B1 and the device E is faulty, or the device B1 cannot forward a BIERv6 packet.

There are a plurality of specific manners in which the device E determines that the device B1 is faulty. This is not specifically limited in this application. Several possible implementations are enumerated below.

In one possible implementation, the device E enables a PIM protocol, and sends a packet, such as a PIM HELLO packet, to the device B1. Similarly, the device B1 enables the PIM protocol, and sends a packet, such as the PIM HELLO packet, to the device E. If the device E can receive the message sent by the device B1, it can be understood as that the device B1 is not faulty or the link between the device B1 and the device E is not faulty. If the device E cannot receive a message sent by the device B1, the device E can understand as that the device B1 is faulty or the link between the device B1 and the device E is faulty.

In another possible implementation, bidirectional forwarding detection (bidirectional forwarding detection, BFD) may be further deployed between the device E and the device B1. After a BFD session is created, a BFD control packet is periodically sent. If one party does not receive the BFD control packet in a preset time interval, it is considered that a path or one party is faulty. For example, the BFD control packet is sent between the device E and the device B1 at specific time intervals. If the device E can receive, in the time interval, the BFD control packet sent by the device B1, it can be understood as that the device B1 is not faulty or the link between the device B1 and the device E is not faulty. If the device E does not receive, in the time interval, the BFD control packet sent by the device B1, it can be understood as that the device B1 is faulty or the link between the device B1 and the device E is faulty.

Optionally, in this embodiment of this application, when sending the BFD control packet to the device B1, the device E may use the End.BIER address of the device B1.

It should be understood that the End.BIER address of the device B1 is not a common IPv6 address, but a specific IPv6 address that is on the device B1 and that is used to process the BIERv6 packet. After the End.BIER address is configured on the device B1, a forwarding entry with a 128-bit mask is formed for the address in a forwarding information base (forwarding information base, FIB), and the forwarding entry identifies that the address is End.BIER. When receiving an IPv6 packet, the device B1 first searches the FIB for a destination address. When a result of searching the FIB is that the destination address is an End.BIER address, the device B1 performs an End.BIER-specific action, that is, continues to process a BIER header in an IPv6 extension packet header. Alternatively, if the destination address is a common IPv6 destination address, the result of searching the FIB indicates that the packet is an IPv6 packet that is sent to a current router and that includes a destination option extension packet header. In this case, the packet may be sent to a CPU for processing, and cannot be processed on a data plane.

It should be further understood that End.BIER of the device B1 is merely used to direct the device B1 to process the BIERv6 packet, and BIER forwarding depends on a BIERv6 packet header in an extension packet header, including determining, based on a BIFT-id field in the BIERv6 packet header, specific <SD, BSL, SI>to which the packet belongs; and then determining, based on a bit string, a specific BFER node that is of which SI and to which the packet is to be sent.

The device E sends the BFD control packet to the device B1 by using the End.BIER address of the device B1. If the device E cannot receive, in a preset time interval, the BFD control packet sent by the device B1, it can be determined that the device B1 cannot forward the BIERv6 packet. To be specific, when the device B1 modifies a configuration of the End.BIER address or a BIER process of the device B1 is faulty, if the device E sends the BFD control packet to the device B1 by using the End.BIER address of the device B1, the device B1 does not send the BFD control packet to the device E in the present time interval. In this way, the device E can also perceive that the device B1 cannot forward the BIERv6 packet, thereby further improving detection accuracy.

Step 830: The device E determines whether there is a backup next hop for reaching the devices R1 to R5.

If the device E determines, through search, that there is a backup next hop for reaching the devices R1 to R5 whose BFR IDs are respectively 1 to 5, the device E performs step 840.

If there is no backup next hop for reaching the devices R1 to R5 whose BFR IDs are respectively 1 to 5, the device E performs step 850.

Step 840: The device E sends a BIERv6 packet to the backup next hop.

In this embodiment of this application, to avoid occurrence of traffic interruption, the active next hop and the backup next hop for reaching the devices R1 to R5 whose BFR IDs are respectively 1 to 5 are configured on the device E. When the active next hop is not faulty, the device E sends, through a path of the active next hop, the BIERv6 packet to the devices R1 to R5 whose BFR IDs are respectively 1 to 5. When the active next hop is faulty, the device E sends, through a path of the backup next hop, the BIERv6 packet to the devices R1 to R5 whose BFR IDs are respectively 1 to 5.

For ease of description, an example in which the active next hop through which the device E reaches the devices R1 to R5 whose BFR IDs are respectively 1 to 5 is the device B1, and the backup next hop through which the device E reaches the devices R1 to R5 whose BFR IDs are respectively 1 to 5 is the device B2 is used below for description.

Specifically, when the device B1 is faulty, if the backup next hop for reaching the devices R1 to R5 whose BFR IDs are respectively 1 to 5 is configured on the device E, the device E sets, to be inactive (inactive), a routing table in which a next hop device is the device B1. The device E sets, to be active (active), a routing table of the backup next hop for reaching the devices R1 to R5 whose BFR IDs are respectively 1 to 5, and selects a new routing table in an active state as a forwarding table. For example, the device E switches, to the device B2, a next hop for reaching the devices R1 to R5 whose BFR IDs are respectively 1 to 5, and then the device B2 replicates and forwards the BIERv6 packet.

A possible BIERv6 routing table on the device E is described below by using an example in which R1 is a leaf node and a static next hop on the device E is the device B.
  BIER Sub-Domain 0 Routing Table
  Route Entry For BitStringLength 256, SetIdentifier 0
  BFR Neighbor: --(static)
  BIFT-ID: 1
  BFR End.BIER: 200:B1:1::1
  Relay NextHop: FE80::1234:5678:90AB:CDEF
  Out Interface: Ethernet1/0/1
  F-BM(Hex): 0000000000000000000000000000000000000000000-000000000000001
  Bfd Enble: Yes
  Bfd Name: BierE_B1
  Bfd Status: up
  Route Status: Active backup (the forwarding table is not selected when not in a backup state)
  BFR End.BIER: 200:B2:1::1
  Relay NextHop: FE80::1234:5678:90AB:CDEE
  Out Interface: Ethernet1/0/2
  F-BM(Hex): 0000000000000000000000000000000000000000000-00000000000001
  Bfd Enble: Yes
  Track Bfd: BierE_B2
  Bfd Status: up
  Route Status: backup In the foregoing routing table, "BFR Neighbor: --(static)" indicates that all BFR neighbors are dynamically generated. For a static next hop of a BIER, only "Static" is marked herein. "BIFT-ID: 1" indicates that a BFR-id of the leaf node is 1. "BFR End.BIER: 200:B1:1::1" indicates End.BIER whose static next hop is the device B1. "Relay NextHop: FE80::1234:5678:90AB:CDEF" indicates a next-hop IP of the End.BIER router of the device B1. "Out Interface: Ethernet1/0/1" indicates a next-hop out interface of the End.BIER router of the device B1. "F-BM(Hex): 0000000000000000000000000000000000000000000-00000000000001" indicates bit string information of the BIER. "Bfd Enble: Yes" indicates an associated bfd enabling a static forwarding table of the BIER. "Bfd Name: BierE_B1" indicates name information of the associated bfd of the static forwarding table of the BIER. "Bfd Status: up" indicates that the associated bfd of the static forwarding table of the BIER is UP. "Route Status: Active" indicates that a status of the static forwarding table of the BIER is Active, that is, the forwarding table is selected. If the status of the static forwarding table of the BIER is Inactive, the forwarding table is not selected (for example, the associated bfd is down). "BFR End.BIER: 200: B2:1::1" indicates End.BIER whose next hop is the device B2. "Relay NextHop: FE80::1234:5678:90AB:CDEE" indicates a next-hop IP of the End.BIER router of the device B2. "Out Interface: Ethernet1/0/2" indicates a next-hop out interface of the End.BIER router of the device B2. "Route Status: backup" indicates that the forwarding table is not selected when not in a backup state, and the forwarding table is selected when in the backup state.

Step 850: The device E does not find a backup next hop for reaching the devices R1 to R5, and traffic is interrupted.

In the foregoing technical solution, reachability of a next-hop BIER device can be quickly perceived. When the next-hop BIER device is faulty, multicast traffic is switched to a backup next-hop BIER device. In this way, not only an existing BIERv6 solution is well extended, but also a BIER multicast service can be quickly switched after a node is faulty.

The method for forwarding a BIERv6 packet provided in the embodiments of this application is described above in detail with reference to FIG. 1 to FIG. 9. Apparatus embodiments of this application are described below in detail with reference to FIG. 10 to FIG. 12. It should be understood that description of the method embodiment corresponds to description of the apparatus embodiment. Therefore, for a part that is not described in detail, refer to the foregoing method embodiment.

Figure 10:
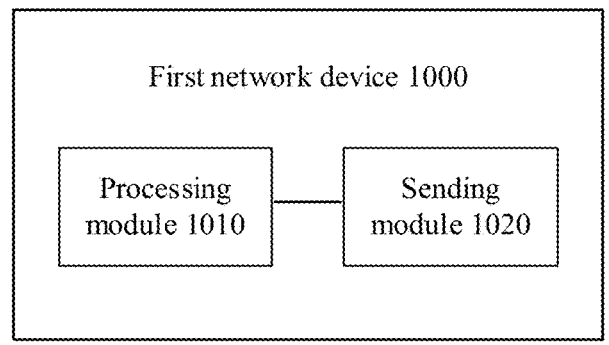
FIG. 10 is a schematic structural diagram of a first network device 1000 according to an embodiment of this application.

FIG. 10 is a schematic structural diagram of a first network device 1000 according to an embodiment of this application. The first network device 1000 shown in FIG. 10 may perform corresponding steps performed by the first network device in the method in the foregoing embodiment. As shown in FIG. 10, the first network device 1000 includes a processing module 1010 and a sending module 1020.

The processing module 1010 is configured to determine that an active next-hop device for reaching a second network device is faulty. The first network device is an ingress device in a BIER domain, the second network device is an egress device in the BIER domain, the first network device belongs to a first area in the BIER domain, the second network device and the active next-hop device belong to a second area in the BIER domain, the active next-hop device is a border device in the second area and is configured to connect to the first area, and the first area and the second area have different protocols.

The sending module 1020 is configured to send an Internet Protocol version 6-based bit index explicit replication BIERv6 packet to a backup next-hop device for reaching the second network device. The backup next-hop device is a border device in the second area and is configured to connect to the first area.

Optionally, the processing module 1010 is further configured to determine, based on a network topology of the BIER domain, the active next-hop device and the backup next-hop device for reaching the second network device.

Optionally, the sending module 1020 is further configured to send a bidirectional forwarding detection BFD control packet to the active next-hop device. A destination address of the BFD control packet is a first address of the active next-hop device, and the first address is used to direct the active next-hop device to perform BIER forwarding on the BIERv6 packet.

The processing module 1010 is further configured to: if a BFD control packet sent by the active next-hop device is not received in a preset time interval, determine that the active next-hop device is faulty.

Optionally, that the active next-hop device is faulty includes one or more of the following cases: the active next-hop device itself is faulty, a communications link between the active next-hop device and the first network device is faulty, or the active next-hop device does not support BIER forwarding on the BIERv6 packet.

Figure 11:
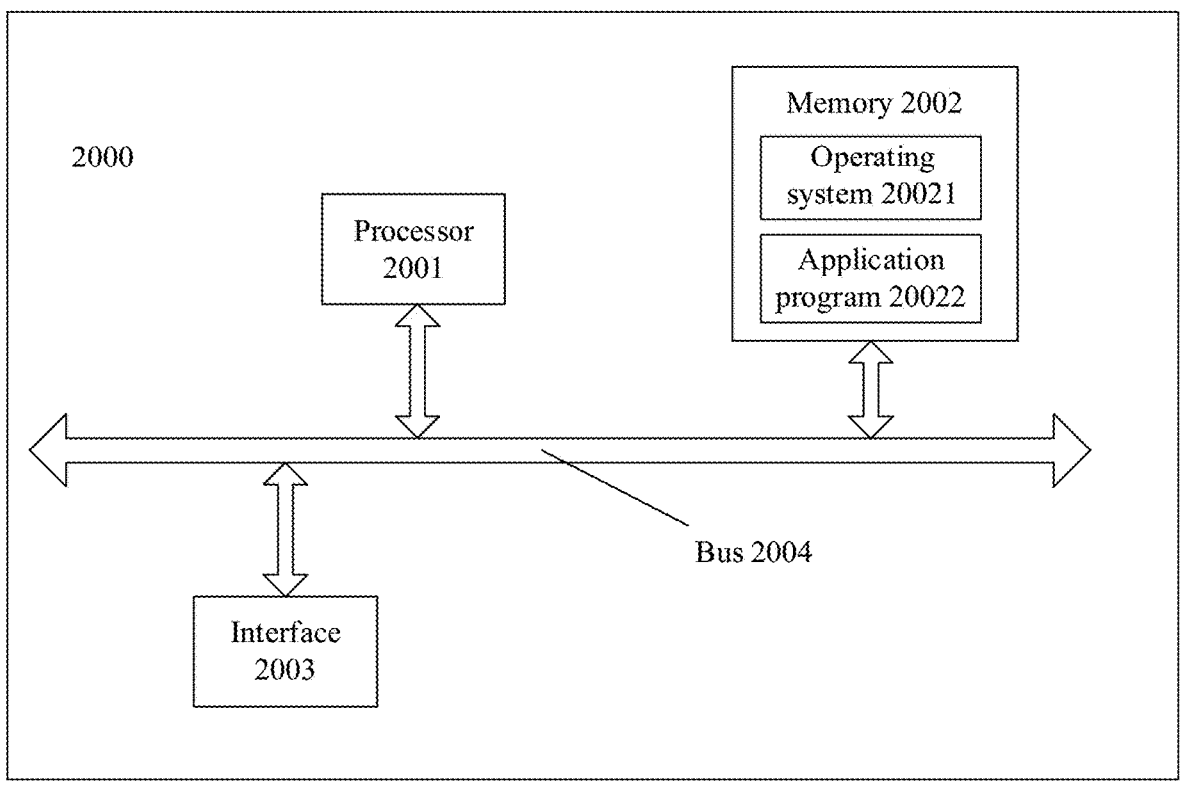
FIG. 11 is a schematic diagram of a hardware structure of a first network device 2000 according to an embodiment of this application.

FIG. 11 is a schematic diagram of a hardware structure of a first network device 2000 according to an embodiment of this application. The first network device 2000 shown in FIG. 11 may perform corresponding steps performed by the first network device in the method in the foregoing embodiment.

As shown in FIG. 11, the first network device 2000 includes a processor 2001, a memory 2002, an interface 2003, and a bus 2004. The interface 2003 may be implemented in a wireless or wired manner, and specifically, may be a network interface card. The processor 2001, the memory 2002, and the interface 2003 are connected through the bus 2004.

The interface 2003 may specifically include a transmitter and a receiver, configured to implement the foregoing sending and receiving by the first network device. For example, the interface 2003 is configured to receive a BIERv6 packet, or is configured to send a BIERv6 packet to a backup next-hop device for reaching the second network device.

The processor 2001 is configured to perform processing performed by the first network device in the foregoing embodiment. For example, the processor 2001 is configured to determine that an active next-hop device for reaching the second network device is faulty; and/or is configured to perform another process described in the technology described herein. The memory 2002 includes an operating system 20021 and an application program 20022, and is configured to store a program, code, or instructions. When the processor or a hardware device executes the program, code, or instructions, a processing process of the first network device in the method embodiment can be completed. Optionally, the memory 2002 may include a read-only memory (read-only memory, ROM) and a random access memory (random access memory, RAM). The ROM includes a basic input/output system (basic input/output system, BIOS) or an embedded system, and the RAM includes an application program and an operating system. When the first network device 2000 needs to be run, a bootloader in the BIOS or an embedded system that is fixed in the ROM is used to guide a system to be started, to guide the first network device 2000 to enter a normal running state. After entering the normal running state, the first network device 2000 runs the application program and the operating system in the RAM, to complete a processing process of the first network device 2000 in the method embodiment.

It can be understood that FIG. 11 shows only a simplified design of the first network device 2000. In actual application, the first network device may include any quantity of interfaces, processors, or memories.

Figure 12:
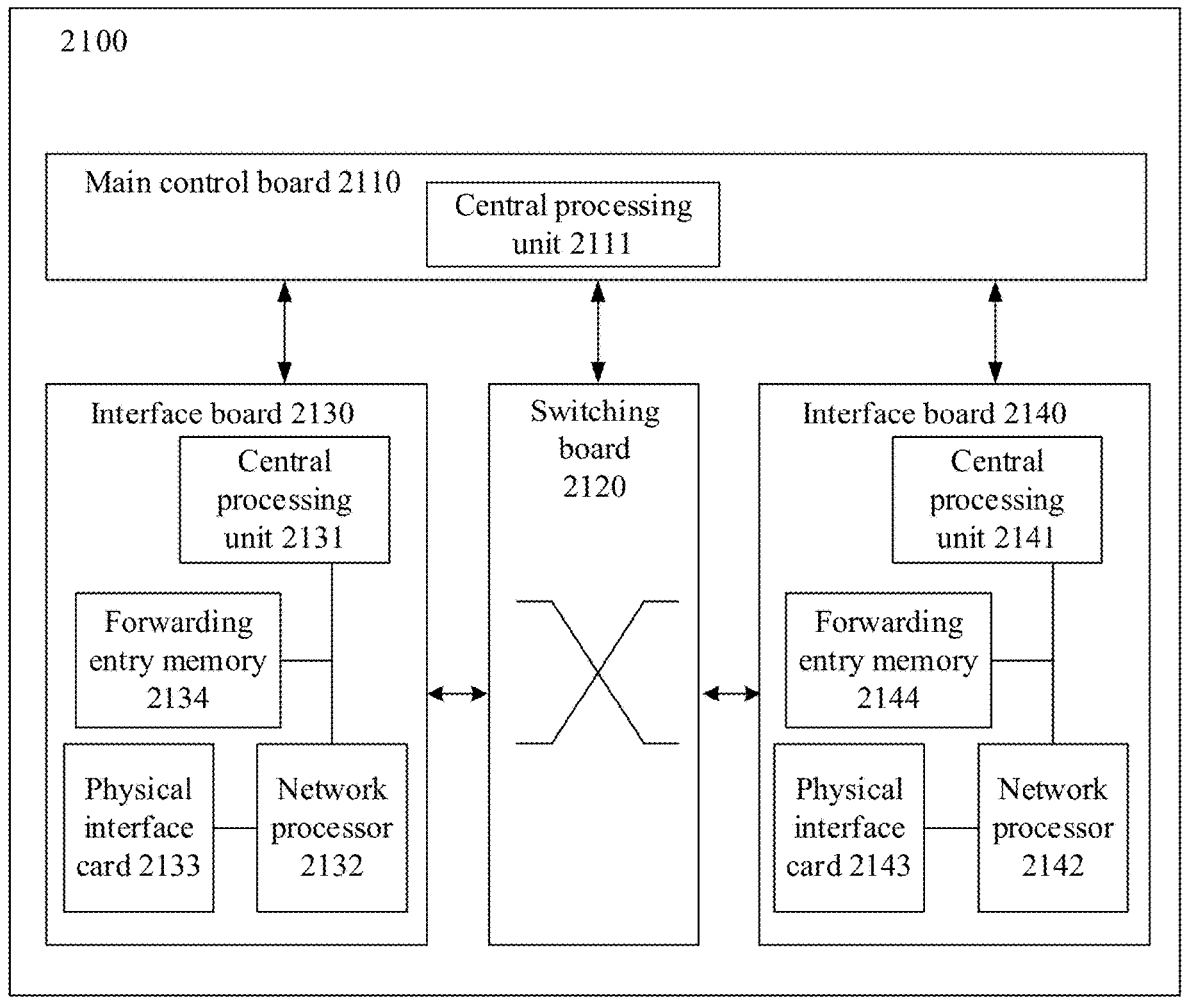
FIG. 12 is a schematic diagram of a hardware structure of another first network device 2100 according to an embodiment of this application.

FIG. 12 is a schematic diagram of a hardware structure of another first network device 2100 according to an embodiment of this application. The first network device 2100 shown in FIG. 12 may perform corresponding steps performed by the first network device in the method in the foregoing embodiment.

As shown in FIG. 12, the first network device 2100 includes a main control board 2110, an interface board 2130, a switching board 2120, and an interface board 2140. The main control board 2110, the interface boards 2130 and 2140, and the switching board 2120 are connected to a system backplane through a system bus to implement mutual communication. The main control board 2110 is configured to implement functions such as system management, device maintenance, and protocol processing. The switching board 2120 is configured to exchange data between the interface boards (the interface board is also referred to as a line card or a service board). The interface boards 2130 and 2140 are configured to provide various service interfaces (such as a POS interface, a GE interface, and an ATM interface) and implement packet forwarding.

The interface board 2130 may include a central processing unit 2131, a forwarding entry memory 2134, a physical interface card 2133, and a network processor 2132. The central processing unit 2131 is configured to control and manage the interface board and communicate with a central processing unit on the main control board. The forwarding entry memory 2134 is configured to store an entry, for example, the foregoing BIFT. The physical interface card 2133 is configured to receive and send traffic.

It should be understood that in this embodiment of this application, an operation on the interface board 2140 is the same as an operation on the interface board 2130. For brevity, details are not described again.

It should be understood that the first network device 2100 in this embodiment may correspond to functions and/or steps implemented in the foregoing method embodiment, and details are not described herein again.

In addition, it should be noted that there may be one or more main control boards. When there are a plurality of main control boards, the main control boards may include an active main control board and a backup main control board. There may be one or more interface boards. A stronger data processing capability of the first network device indicates a larger quantity of provided interface boards. There may also be one or more physical interface cards on the interface board. There may be no switching board or may be one or more switching boards. When there are a plurality of switching boards, the switching boards may jointly implement load sharing and redundancy backup. In a centralized forwarding architecture, the first network device may not need a switching board, and the interface board undertakes a service data processing function of an entire system. In a distributed forwarding architecture, the first network device may have at least one switching board, and data is exchanged between a plurality of interface boards by using the switching board, to provide a capability of exchanging and processing a large capacity of data. Therefore, a data access and processing capability of the first network device in the distributed architecture is greater than that of the device in the centralized architecture. A specific architecture to be used depends on a specific networking deployment scenario, and is not limited herein.

An embodiment of this application further provides a computer-readable medium. The computer-readable medium stores program code, and when the computer program code is run on a computer, the computer is enabled to perform the method performed by the first network device. The computer-readable medium includes but is not limited to one or more of the following: a read-only memory (read-only memory, ROM), a programmable ROM (programmable ROM, PROM), an erasable PROM (erasable PROM, EPROM), a Flash memory, an electrically EPROM (electrically EPROM, EEPROM), or a hard drive (hard drive).

An embodiment of this application further provides a chip system applied to a first network device. The chip system includes at least one processor, at least one memory, and an interface circuit. The interface circuit is responsible for information exchange between the chip system and the outside. The at least one memory, the interface circuit, and the at least one processor are interconnected through a line. The at least one memory stores instructions, and the instructions are executed by the at least one processor, to perform operations of the first network device in the methods in the foregoing aspects.

In a specific implementation process, the chip may be implemented in a form of a central processing unit (central processing unit, CPU), a micro controller unit (micro controller unit, MCU), a micro processing unit (micro processing unit, MPU), a digital signal processor (digital signal processor, DSP), a system on chip (system on chip, SoC), an application-specific integrated circuit (application-specific integrated circuit, ASIC), a field programmable gate array (field programmable gate array, FPGA), or a programmable logic device (programmable logic device, PLD).

An embodiment of this application further provides a computer program product applied to a first network device. The computer program product includes a series of instructions, and when the instructions are run, operations of the first network device in the methods in the foregoing aspects are performed.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending an Internet Protocol version 6-based bit index explicit replication (BIERv6) packet, wherein the method comprises:
    determining, by a first network device, that an active next-hop device for reaching a second network device is faulty, wherein the first network device is an ingress device in a BIER domain, the second network device is an egress device in the BIER domain, the first network device belongs to a first area in the BIER domain, the second network device and the active next-hop device belong to a second area in the BIER domain, the active next-hop device is a border device in the second area and is configured to connect to the first area, and the first area and the second area have different protocols; and
    sending, by the first network device, a BIERv6 packet to a backup next-hop device for reaching the second network device, wherein the backup next-hop device is a border device in the second area and is configured to connect to the first area.

2. The method according to claim 1, wherein the method further comprises:
    determining, by the first network device based on a network topology of the BIER domain, the active next-hop device and the backup next-hop device for reaching the second network device.

3. The method according to claim 1, wherein the determining, by a first network device, that an active next-hop device reaching a second network device is faulty comprises:
    sending, by the first network device, a bidirectional forwarding detection (BFD) control packet to the active next-hop device, wherein a destination address of the BFD control packet is a first address of the active next-hop device, and the first address is used to direct the active next-hop device to perform BIER forwarding on the BIERv6 packet; and
    if the first network device does not receive, in a preset time interval, a BFD control packet sent by the active next-hop device, determining, by the first network device, that the active next-hop device is faulty.

4. The method according to claim 1, wherein that the active next-hop device is faulty comprises one or more of the following cases: the active next-hop device itself is faulty, a communications link between the active next-hop device and the first network device is faulty, or the active next-hop device does not support BIER forwarding on the BIERv6 packet.

5. A first network device, comprising:
a memory storing instructions; and
a processor coupled to the memory; wherein the instructions, when executed by the processor, cause the first network device to:
determine that an active next-hop device for reaching a second network device is faulty, wherein the first network device is an ingress device in a BIER domain, the second network device is an egress device in the BIER domain, the first network device belongs to a first area in the BIER domain, the second network device and the active next-hop device belong to a second area in the BIER domain, the active next-hop device is a border device in the second area and is configured to connect to the first area, and the first area and the second area have different protocols; and
send an Internet Protocol version 6-based bit index explicit replication (BIERv6) packet to a backup next-hop device for reaching the second network device, wherein the backup next-hop device is a border device in the second area and is configured to connect to the first area.

6. The first network device according to claim 5, wherein the instructions, when executed by the processor, further cause the first network to:
determine, based on a network topology of the BIER domain, the active next-hop device and the backup next-hop device for reaching the second network device.

7. The first network device according to claim 5, wherein the instructions, when executed by the processor, further cause the first network device to:
send a bidirectional forwarding detection (BFD) control packet to the active next-hop device, wherein a destination address of the BFD control packet is a first address of the active next-hop device, and the first address is used to direct the active next-hop device to perform BIER forwarding on the BIERv6 packet; and
if a BFD control packet sent by the active next-hop device is not received in a preset time interval, determine that the active next-hop device is faulty.

8. The first network device according to claim 5, wherein that the active next-hop device is faulty comprises one or more of the following cases: the active next-hop device itself is faulty, a communications link between the active next-hop device and the first network device is faulty, or the active next-hop device does not support BIER forwarding on the BIERv6 packet.

9. A non-transitory computer-readable storage medium, comprising a computer program or code, wherein when the computer program or code is run on a computer, cause the computer to:
determine that an active next-hop device for reaching a second network device is faulty, wherein the first network device is an ingress device in a BIER domain, the second network device is an egress device in the BIER domain, the first network device belongs to a first area in the BIER domain, the second network device and the active next-hop device belong to a second area in the BIER domain, the active next-hop device is a border device in the second area and is configured to connect to the first area, and the first area and the second area have different protocols; and
send an Internet Protocol version 6-based bit index explicit replication (BIERv6) packet to a backup next-hop device for reaching the second network device, wherein the backup next-hop device is a border device in the second area and is configured to connect to the first area.

10. The computer-readable storage medium according to claim 9, wherein when the computer program or code is run on a computer, further cause the computer to:
determine, based on a network topology of the BIER domain, the active next-hop device and the backup next-hop device for reaching the second network device.

11. The computer-readable storage medium according to claim 9, wherein when the computer program or code is run on a computer, further cause the computer to:
send a bidirectional forwarding detection (BFD) control packet to the active next-hop device, wherein a destination address of the BFD control packet is a first address of the active next-hop device, and the first address is used to direct the active next-hop device to perform BIER forwarding on the BIERv6 packet; and
if a BFD control packet sent by the active next-hop device is not received in a preset time interval, determine that the active next-hop device is faulty.

12. The computer-readable storage medium according to claim 9, wherein that the active next-hop device is faulty comprises one or more of the following cases: the active next-hop device itself is faulty, a communications link between the active next-hop device and the first network device is faulty, or the active next-hop device does not support BIER forwarding on the BIERv6 packet.

* * * * *